(12) United States Patent
Mizukami et al.

(10) Patent No.: US 8,379,345 B2
(45) Date of Patent: Feb. 19, 2013

(54) SPINDLE MOTOR HAVING DYNAMIC PRESSURE FLUID BEARING FOR USE IN A STORAGE DISK DRIVE

(75) Inventors: Junya Mizukami, Kyoto (JP); Takayuki Oe, Kyoto (JP); Yoichi Sekii, Kyoto (JP); Naoki Sabashi, Kyoto (JP); Hideki Nishimura, Kyoto (JP); Takehito Tamaoka, Kyoto (JP); Takashi Yamamoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 73 days.

(21) Appl. No.: 13/198,793

(22) Filed: Aug. 5, 2011

(65) Prior Publication Data

US 2012/0033328 A1    Feb. 9, 2012

(30) Foreign Application Priority Data

Aug. 9, 2010  (JP) ................................. 2010-178965
Mar. 3, 2011  (JP) ................................. 2011-046787
May 12, 2011 (JP) ................................. 2011-107628

(51) Int. Cl.
*G11B 17/08*    (2006.01)

(52) U.S. Cl. ............... 360/99.08; 360/98.07; 360/271.3; 384/110; 384/123

(58) Field of Classification Search ............... 360/98.07, 360/99.04, 99.08, 271.3; 384/110, 114–123, 384/132
See application file for complete search history.

(56) References Cited

U.S. PATENT DOCUMENTS

| 5,880,545 | A  | 3/1999 | Takemura et al. |
| 6,991,376 | B2 | 1/2006 | Aiello et al. |

(Continued)

FOREIGN PATENT DOCUMENTS

| JP | 08-275435 A   | 10/1996 |
| JP | 2003-056555 A | 2/2003 |

(Continued)

OTHER PUBLICATIONS

Mizukami et al., "Motor and Storage Disk Drive," Chinese Patent Application No. 201210021666.6, filed Jan. 31, 2012.

(Continued)

*Primary Examiner* — Allen Heinz
(74) *Attorney, Agent, or Firm* — Keating & Bennett, LLP

(57) ABSTRACT

A spindle motor includes a stationary portion and a rotating portion. The stationary portion preferably includes a shaft portion, an upper thrust portion, and an outer tubular portion. The rotating portion preferably includes an inner tubular portion, a flange portion, an upper hub annular portion, and a lower hub annular portion. The flange portion includes a communicating hole. An upper surface of a lubricating oil is located in a fifth gap defined between an upper thrust portion and an upper hub annular portion, while a lower surface of the lubricating oil is located in a sixth gap defined between an outer tubular portion and a lower hub annular portion. The communicating hole and a space extending from the fifth gap to the sixth gap through a fourth gap, a first gap, a second gap, and a third gap are continuously filled with the lubricating oil.

20 Claims, 20 Drawing Sheets

U.S. PATENT DOCUMENTS

| | | | |
|---|---|---|---|
| 8,300,355 B2 * | 10/2012 | Yang | 360/99.08 |
| 2004/0090702 A1 | 5/2004 | Aiello et al. | |
| 2006/0182374 A1 | 8/2006 | Schwamberger et al. | |
| 2007/0030591 A1 | 2/2007 | Engesser et al. | |
| 2007/0133911 A1 | 6/2007 | Nishimoto et al. | |
| 2008/0187257 A1 | 8/2008 | Engesser et al. | |
| 2008/0292228 A1 | 11/2008 | Yamashita et al. | |
| 2009/0140587 A1 | 6/2009 | Popov et al. | |
| 2010/0124387 A1 | 5/2010 | Fuss et al. | |
| 2010/0142869 A1 | 6/2010 | Grantz et al. | |
| 2010/0266225 A1 | 10/2010 | Yamashita et al. | |
| 2011/0192210 A1 | 8/2011 | Yamashita et al. | |

FOREIGN PATENT DOCUMENTS

| | | |
|---|---|---|
| JP | 2003-061295 A | 2/2003 |
| JP | 2006-105390 A | 4/2006 |
| JP | 2007-162759 A | 6/2007 |
| JP | 2009-136143 A | 6/2009 |
| JP | 2010-121775 A | 6/2010 |
| KR | 10-2010-0064349 A | 6/2010 |

OTHER PUBLICATIONS

Mizukami et al., "Spindle Motor and Storage Disk Drive," U.S. Appl. No. 13/198,776, filed Aug. 5, 2011.
Mizukami et al., "Spindle Motor and Storage Disk Drive," U.S. Appl. No. 13/198,784, filed Aug. 5, 2011.
Mizukami et al., "Spindle Motor and Storage Disk Drive," U.S. Appl. No. 13/198,787, filed Aug. 5, 2011.
Mizukami et al., "Spindle Motor and Storage Disk Drive," U.S. Appl. No. 13/198,794, filed Aug. 5, 2011.
Mizukami et al., "Spindle Motor and Storage Disk Drive," U.S. Appl. No. 13/198,797, filed Aug. 5, 2011.
Yamaguchi et al., "Method of Manufacturing Fluid Dynamic Bearing Mechanism, Motor, and Storage Disk Drive," U.S. Appl. No. 13/353,554, filed Jan. 19, 2012.
Tamaoka et al., "Motor and Storage Disk Drive," U.S. Appl. No. 13/353,557, filed Jan. 19, 2012.
Yamamoto et al., "Spindle Motor and Storage Disk Drive," U.S. Appl. No. 13/353,563, filed Jan. 19, 2012.

* cited by examiner

SPINDLE MOTOR HAVING DYNAMIC PRESSURE FLUID BEARING FOR USE IN A STORAGE DISK DRIVE

BACKGROUND OF THE INVENTION

1. Field of the Invention

The present invention relates to a spindle motor and mores specifically to a spindle motor for use in a storage disk drive.

2. Description of the Related Art

Motors including a bearing mechanism using fluid dynamic pressure have often been used in storage disk drives. An example of a known dynamic pressure fluid bearing apparatus in a spindle motor is disclosed in JP-A 2007-162759. This spindle motor includes a shaft body and a tubular sleeve body inside which the shaft body is inserted. The shaft body is fixed to a base plate of the motor. The sleeve body is fixed to a rotor of the motor. The shaft body is provided with a first thrust flange and a second thrust flange. The first thrust flange and second thrust flange are both annular and are arranged on an upper and a lower side of the sleeve body, respectively. In the dynamic pressure fluid bearing apparatus, a radial bearing portion is defined between the shaft body and the sleeve body, and a thrust bearing portion is defined between each of the two thrust flanges and the sleeve body. In addition, the sleeve body includes communicating holes defined therein to provide communication between two thrust gaps. Tapered seal portions are defined in the vicinity of upper and lower end openings of the communicating holes.

Another example of a known fluid dynamic bearing motor is disclosed in U.S. Pat. No. 6,991,376. This spindle motor includes a shaft, a top plate, a bottom plate, and a hub. The top plate and the bottom plate are fixed to an upper end and a lower end of the shaft, respectively. The hub is arranged between the top plate and the bottom plate, and is supported so as to be rotatable with respect to the shaft. The hub includes a recirculation channel extending therethrough defined therein. An upper portion of the hub includes a projecting portion arranged radially outward of an outer edge portion of the top plate. A capillary seal is defined between the projecting portion and the outer edge portion of the top plate. A lower portion of the hub includes another projecting portion arranged radially outward of an outer edge portion of the bottom plate. A capillary seal is also defined between the other projecting portion and the outer edge portion of the bottom plate. The influence of a pressure gradient of a lubricating oil in each of the capillary seals is minimized by the recirculation channel being arranged radially inward of the capillary seals.

In the motor disclosed in JP-A 2007-162759, a difference in pressure between the upper tapered seal portion and the lower tapered seal portion is large because of the large axial distance between a surface of a lubricating oil in the upper tapered seal portion and a surface of the lubricating oil in the lower tapered seal portion. Therefore, when the motor is oriented in a variety of directions, the surface of the lubricating oil in each tapered seal portion will fluctuate greatly. Because of this, it is necessary to provide a complicated design to prevent a leakage of the lubricating oil.

Similarly with respect to the motor disclosed in U.S. Pat. No. 6,991,376, a difference in pressure between the upper capillary seal and the lower capillary seal is large because of the large axial distance between a surface of the lubricating oil in the upper capillary seal and a surface of the lubricating oil in the lower capillary seal.

SUMMARY OF THE INVENTION

A motor according to a preferred embodiment of the present invention includes a stationary portion including a stator, and a rotating portion including a rotor magnet. The stationary portion preferably includes a shaft portion, an upper thrust portion, a lower plate portion, and an outer tubular portion. The upper thrust portion extends radially outward from an upper portion of the shaft portion. The lower plate portion extends radially outward from a lower portion of the shaft portion. The outer tubular portion extends upward from an outer edge portion of the lower plate portion.

The rotating portion preferably includes an inner tubular portion, a flange portion arranged to project radially outward from the inner tubular portion, an upper hub annular portion, and a lower hub annular portion. The inner tubular portion preferably includes an inner circumferential surface arranged to define a first gap together with an outer circumferential surface of the shaft portion, and an outer circumferential surface arranged to define a second gap together with an inner circumferential surface of the outer tubular portion. The flange portion preferably includes a lower surface arranged to define a third gap together with an upper surface of the outer tubular portion, an upper surface arranged to define a fourth gap together with a lower surface of the upper thrust portion, and a communicating hole arranged to extend through the flange portion from the upper surface to the lower surface thereof. The upper hub annular portion is arranged above an outer edge portion of the flange portion. The lower hub annular portion is arranged below the outer edge portion of the flange portion.

The upper thrust portion and the upper hub annular portion are arranged to together define a fifth gap that is continuous with the fourth gap therebetween. The outer tubular portion and the lower hub annular portion are arranged to together define a sixth gap that is continuous with the third gap therebetween. The fifth gap includes an upper surface of a lubricating oil located therein, while the sixth gap includes a lower surface of the lubricating oil located therein. The communicating hole and a space ranging from the fifth gap to the sixth gap through the fourth gap, the first gap, the second gap, and the third gap are continuously filled with the lubricating oil. The first gap includes a dynamic pressure bearing provided therein.

In the motor according to a preferred embodiment of the present invention, it is possible to achieve a reduction in a difference in pressure between the upper seal portion and the lower seal portion because the upper seal portion and the lower seal portion are arranged to be close to each other. This contributes to preventing a leakage of the lubricating oil.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

It is assumed herein that an upper side and a lower side in a direction parallel or substantially parallel to a central axis of a motor are referred to as an "upper side" and a "lower side", respectively. Note that the terms "vertical direction", "upper side", "lower side", and the like as used herein are not meant to indicate relative positions or directions of different members or portions when actually installed in a device. Also note that directions parallel to or substantially parallel to the central axis are referred to by the term "axial direction", "axial", or "axially", that directions radiating from the central axis are simply referred to by the term "radial direction", "radial", or "radially", and that a circumferential direction about the central axis is simply referred to by the term "circumferential direction", "circumferential", or "circumferentially".

Figure 1:
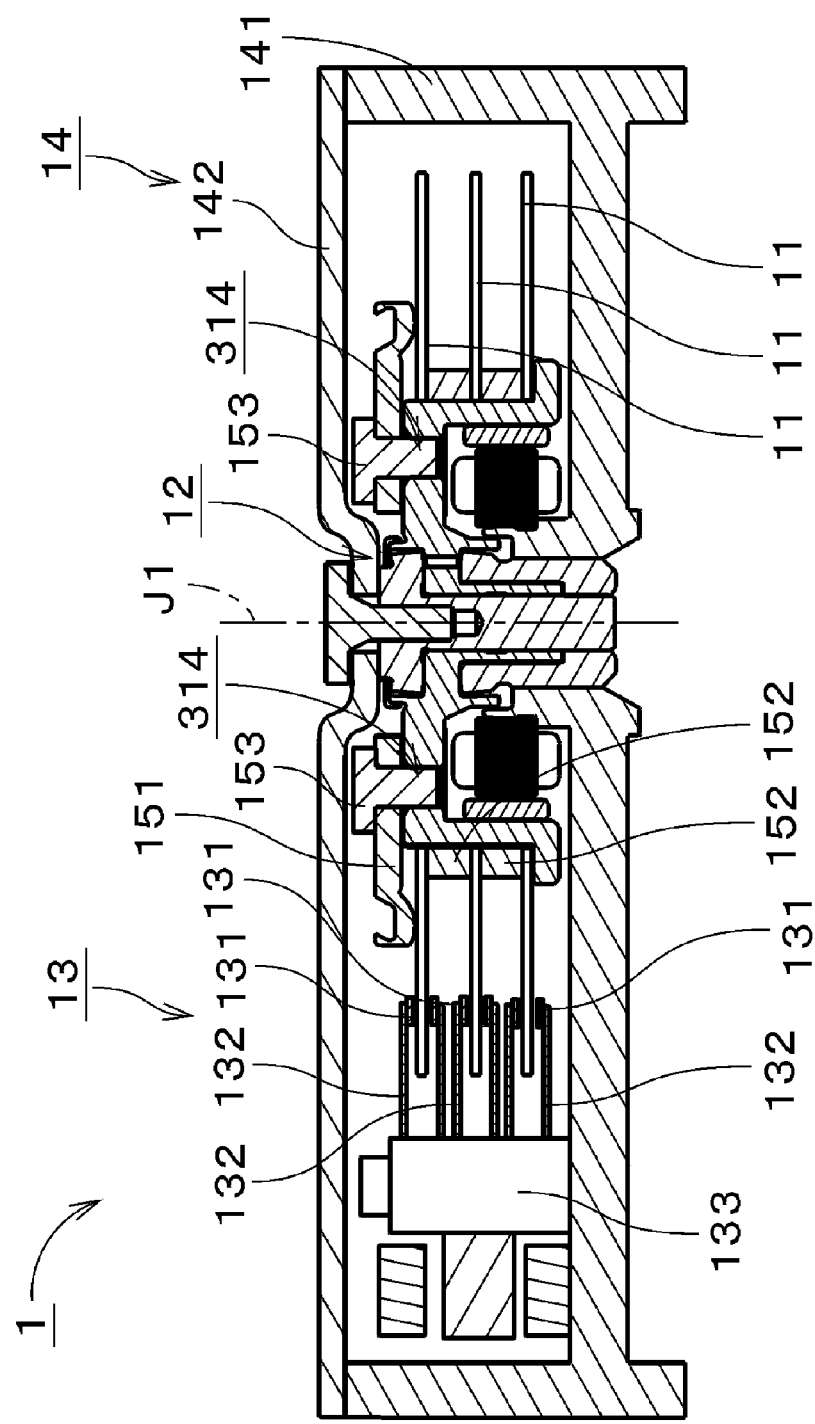
FIG. 1 is a cross-sectional view of a storage disk drive according to a first preferred embodiment of the present invention.

FIG. 1 is a vertical cross-sectional view of a storage disk drive 1 including a spindle motor (hereinafter referred to simply as a "motor") 12 according to a first preferred embodiment of the present invention. The storage disk drive 1 is preferably a so-called hard disk drive. The storage disk drive 1 preferably includes three disks 11, the motor 12, an access portion 13, and a housing 14, for example. The motor 12 is arranged to rotate the disks 11, in which information is stored. The access portion 13 is arranged to read and/or write information from or to the disks 11. In other words, the access portion 13 is arranged to perform at least one of reading and writing of information from or to the disks 11.

The housing 14 preferably includes a first housing member 141 and a second housing member 142. The first housing member 141 is preferably in the shape of a box without a lid. The second housing member 142 is preferably has a flat shape, such as that of a plate. The disks 11, the motor 12, and the access portion 13 are arranged inside the first housing member 141. The second housing member 142 is fitted to the first housing member 141 to thereby define the housing 14. An interior space of the storage disk drive 1 is preferably a clean space with no, or only an extremely small amount of, dirt or dust. In the present preferred embodiment, the interior space of the storage disk drive 1 is filled with air. Note that the interior space of the storage disk drive 1 may alternatively be filled with helium gas, hydrogen gas, a mixture of either or both of these gases and air, or any other desirable gas.

The three disks 11 are fixed to a rotor hub of the motor 12 through a clamper 151 and spacers 152. The access portion 13 preferably includes six heads 131, six arms 132, and a head actuator mechanism 133. Each of the heads 131 is arranged in close proximity to one of the disks 11 to magnetically read and/or write information from or to the disk 11. Each of the arms 132 is arranged to support an associated one of the heads 131. The head actuator mechanism 133 is arranged to move each of the arms 132 to thereby move an associated one of the heads 131 relative to an associated one of the disks 11. The above mechanism enables the head 131 to make access to a desired location on the disk 11 with the head 131 being arranged in close proximity to the rotating disk 11. Note that the number of disks 11 is not limited to three, but may instead be one, two, or any other desirable number greater than three.

Figure 2:
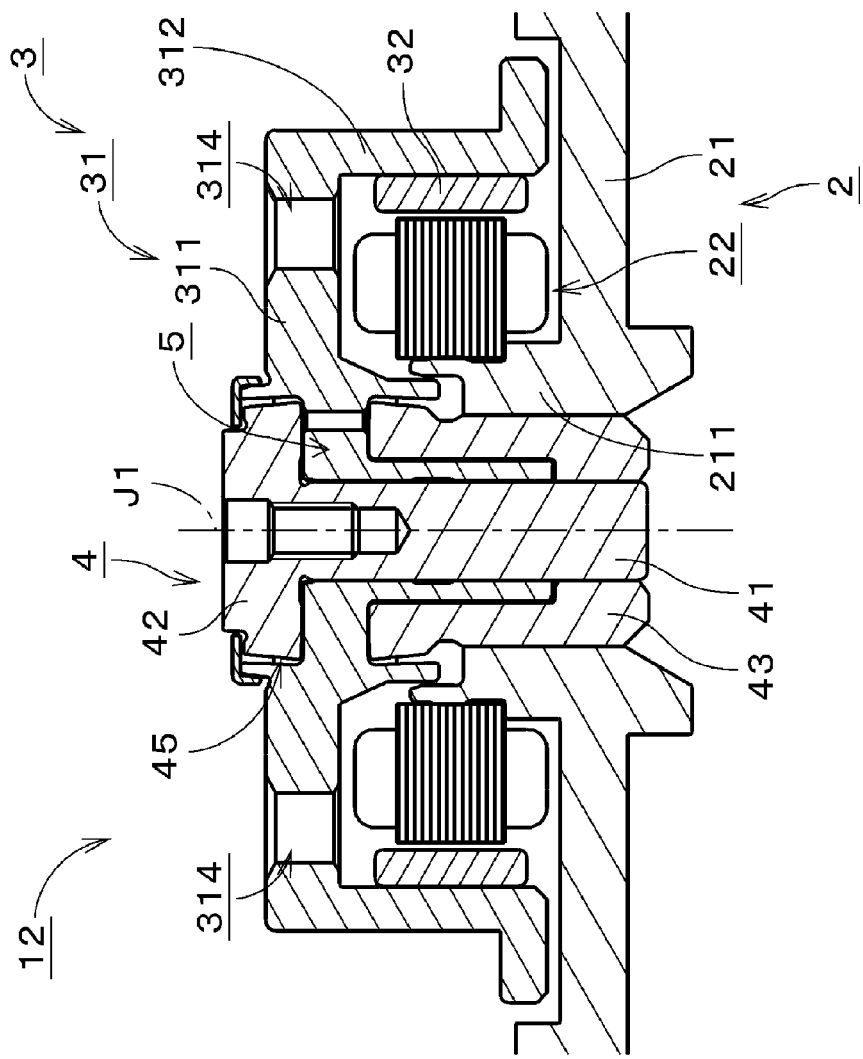
FIG. 2 is a cross-sectional view of a motor according to the first preferred embodiment.

FIG. 2 is a vertical cross-sectional view of the motor 12. The motor 12 is preferably an outer-rotor motor. The motor 12 includes a stationary portion 2 and a rotating portion 3. In FIG. 2, a fluid dynamic bearing mechanism (hereinafter referred to as a "bearing mechanism") defined by a portion of the stationary portion 2 and a portion of the rotating portion 3 is indicated by reference number "4". The rotating portion 3 is supported by the stationary portion 2 through a lubricating oil 45 such that the rotating portion 3 is rotatable about a central axis J1 of the motor 12.

The stationary portion 2 preferably includes a base plate 21, i.e., a base portion, a stator 22, a shaft portion 41, an upper thrust portion 42, and a lower thrust portion 43. The base plate 21 and the first housing member 141 illustrated in FIG. 1 are preferably integrally defined by a single monolithic member and define a portion of the housing 14. The stator 22 is fixed to a circumference of a cylindrical holder 211 defined in the base plate 21. A hole portion is defined inside the holder 211. Note that the base plate 21 and the first housing member 141 may be defined by separate members.

The rotating portion 3 includes a rotor hub 31 and a rotor magnet 32. The rotor hub 31 preferably includes a substantially cylindrical sleeve portion 5, a cover portion 311, and a cylindrical portion 312. The cover portion 311 is arranged to extend radially outward from an upper portion of the sleeve portion 5. The cylindrical portion 312 is arranged to extend axially downward from an outer edge portion of the cover portion 311. The rotor magnet 32 is fixed to an inside of the cylindrical portion 312. The rotor magnet 32 is arranged radially opposite the stator 22. The rotating portion 3 is arranged to be rotated in response to a torque that is generated between the stator 22 and the rotor magnet 32. Note that, if so desired, the sleeve portion 5 may be defined by a member separate from the cover portion 311 and the cylindrical portion 312. In this case, the sleeve portion 5 is fixed to the cover portion 311.

The cover portion 311 preferably includes screw holes 314 arranged to be used to fix the clamper 151 to clamp the disks 11 as illustrated in FIG. 1. Each of the screw holes 314 is arranged above the stator 22, and is arranged to extend through the cover portion 311 in the vertical direction. Referring to FIG. 1, when the clamper 151 is attached to the motor 12, screws 153 are inserted into through holes defined in the clamper 151 and the screw holes 314 to fix the clamper 151 to an upper surface of the cover portion 311.

Figure 3:
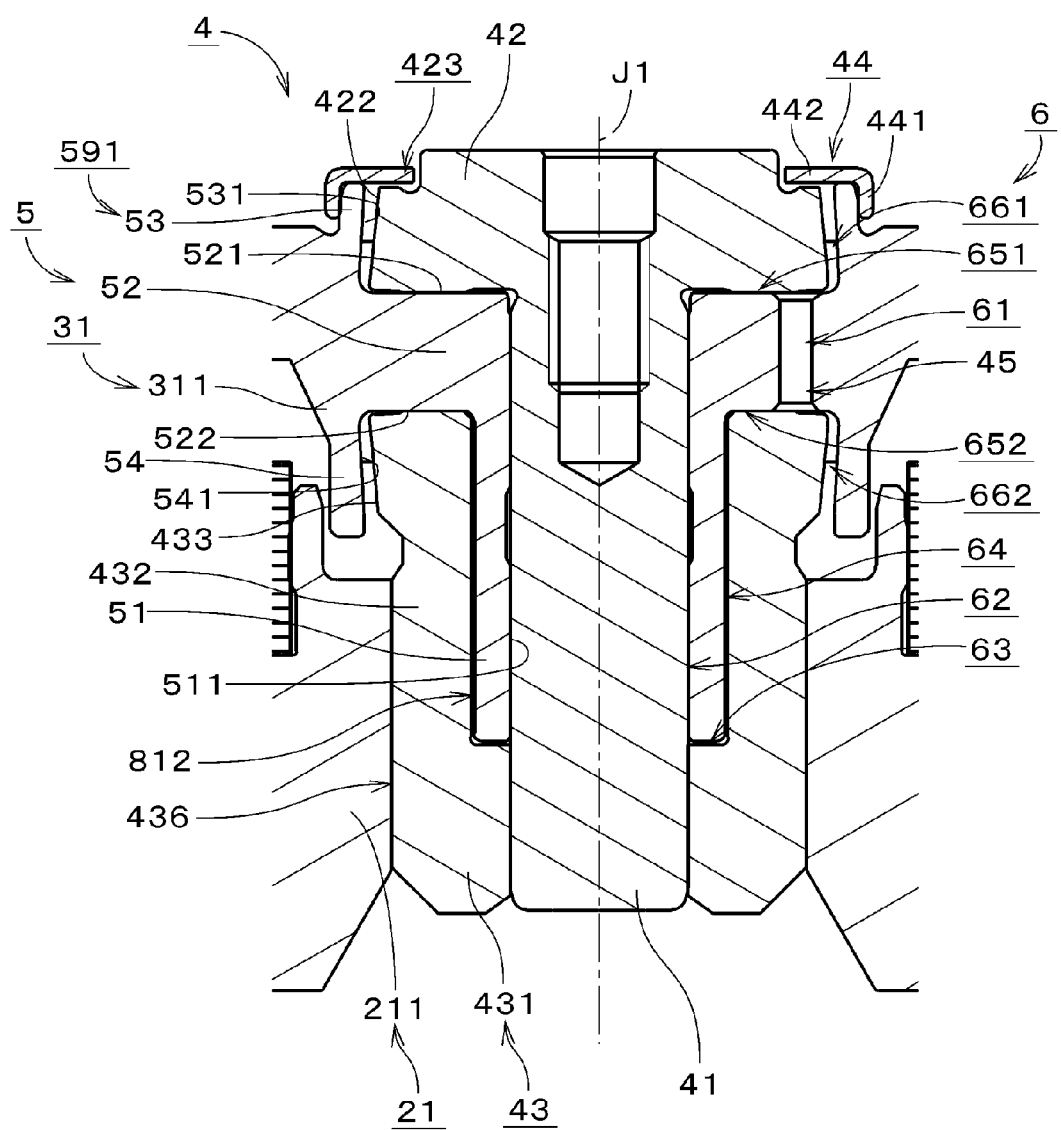
FIG. 3 is a cross-sectional view of a bearing mechanism according to the first preferred embodiment.

FIG. 3 is an enlarged view of the bearing mechanism 4. The bearing mechanism 4 preferably includes the shaft portion 41, the upper thrust portion 42, the lower thrust portion 43, the sleeve portion 5, an annular seal cap 44 (i.e., a cap member), and the lubricating oil 45. As mentioned above, each of the shaft portion 41, the upper thrust portion 42, and the lower thrust portion 43 preferably defines a portion of the stationary portion 2, while the sleeve portion 5 preferably defines a portion of the rotating portion 3. The shaft portion 41 is fixed to a hole portion defined inside the lower thrust portion 43, and is arranged to orient in the vertical direction along the central axis J1. The upper thrust portion 42 includes an upper plate portion which is in the shape of a plate and arranged to spread radially outward from an upper portion of the shaft portion 41. The shaft portion 41 and the upper thrust portion 42 are defined by a single continuous member. The shaft portion 41 and the upper thrust portion 42 are preferably made of stainless steel or the like, for example. An outer circumferential surface 422 of the upper thrust portion 42 includes an inclined surface that is angled in a radially inward direction with increasing height. The upper thrust portion 42 preferably includes a downward recessed shoulder portion 423 defined in an outer edge portion of an upper surface thereof.

The lower thrust portion 43 preferably includes a lower plate portion 431 and an outer tubular portion 432. The lower thrust portion 43 is made of copper, high-strength brass, or the like, for example. The lower plate portion 431 is arranged to extend radially outward from a lower portion of the shaft portion 41. The outer tubular portion 432 is arranged to extend upward from an outer edge portion of the lower plate portion 431. An upper portion of an outer circumferential surface of the outer tubular portion 432 includes an inclined surface 433 that is angled axially in the radially inward direction with decreasing height.

In assembling the motor 12, a lower portion of the outer circumferential surface of the outer tubular portion 432 is inserted inside an inner circumferential surface of the holder 211 of the base plate 21 and fixed thereto through, for example, an adhesive. In comparison to press fit, the above method enables the vertical positioning of the outer tubular portion 432 relative to the base plate 21 to be achieved with greater precision, whereby improved precision in the height of the motor 12 is achieved.

The sleeve portion 5 includes an inner tubular portion 51 and a flange portion 52. The sleeve portion 5 is preferably made of stainless steel, aluminum, copper, or the like, for example. The inner tubular portion 51 is arranged in a substantially cylindrical space defined between the outer tubular portion 432 and the shaft portion 41. The thickness of the inner tubular portion 51 is preferably in the range of about 0.7 mm to about 1 mm, and more preferably 0.75 mm in the present preferred embodiment. The flange portion 52 is arranged to project radially outward from an upper portion of the inner tubular portion 51. Note that, in the following description, a portion that can be considered as either an inner circumferential portion of the flange portion 52 or the upper portion of the inner tubular portion 51 is regarded as a portion of the inner tubular portion 51. The axial thickness of the flange portion 52 is preferably one half or less than one half of the axial dimension of an inner circumferential surface 511 of the inner tubular portion 51. Both an upper surface 521 and a lower surface 522 of the flange portion 52 are preferably arranged to be substantially perpendicular to the central axis J1. The flange portion 52 includes a communicating hole 61 arranged to extend through the flange portion 52 in the vertical direction. The number of communicating holes 61 is preferably one in the present preferred embodiment. However, if so desired, two or more communicating holes 61 could also be defined in the flange portion.

The cover portion 311 of the rotor hub 31 preferably includes an upper hub tubular portion 53 and a lower hub tubular portion 54. The upper hub tubular portion 53 is arranged substantially in the shape of a cylinder, and is arranged to extend axially upward from an outer edge portion of the sleeve portion 5, i.e., an outer edge portion of the flange portion 52. The upper hub tubular portion 53 is arranged radially outward of the upper thrust portion 42. An inner circumferential surface 531 of the upper hub tubular portion 53 includes a portion that is angled in the radially inward direction with increasing height.

The lower hub tubular portion 54 is arranged substantially in the shape of a cylinder, and is arranged to extend downward from the outer edge portion of the flange portion 52. The lower hub tubular portion 54 is arranged radially outward of the outer tubular portion 432 of the lower thrust portion 43. An inner circumferential surface 541 of the lower hub tubular portion 54 includes a portion that is angled in the radially inward direction with decreasing height. Note that the upper and lower hub tubular portions 53 and 54 may be defined by members separate from the flange portion 52 or the cover portion 311.

The seal cap 44 preferably includes a cap cylindrical portion 441, which is centered on the central axis J1, and a cap cover portion 442. The cap cover portion 442 is annular, and is arranged to extend radially inward from the cap cylindrical portion 441. The cap cylindrical portion 441 is fitted to the upper hub tubular portion 53, whereby the seal cap 44 is attached to the sleeve portion 5. A radially inner portion of the cap cover portion 442 is arranged above a bottom portion of the shoulder portion 423.

Referring to FIG. 2, the rotating portion 3, which includes the sleeve portion 5, is arranged to rotate through the lubricating oil 45 with respect to the shaft portion 41, the upper thrust portion 42, and the lower thrust portion 43 while the motor 12 is driven.

Figure 4:
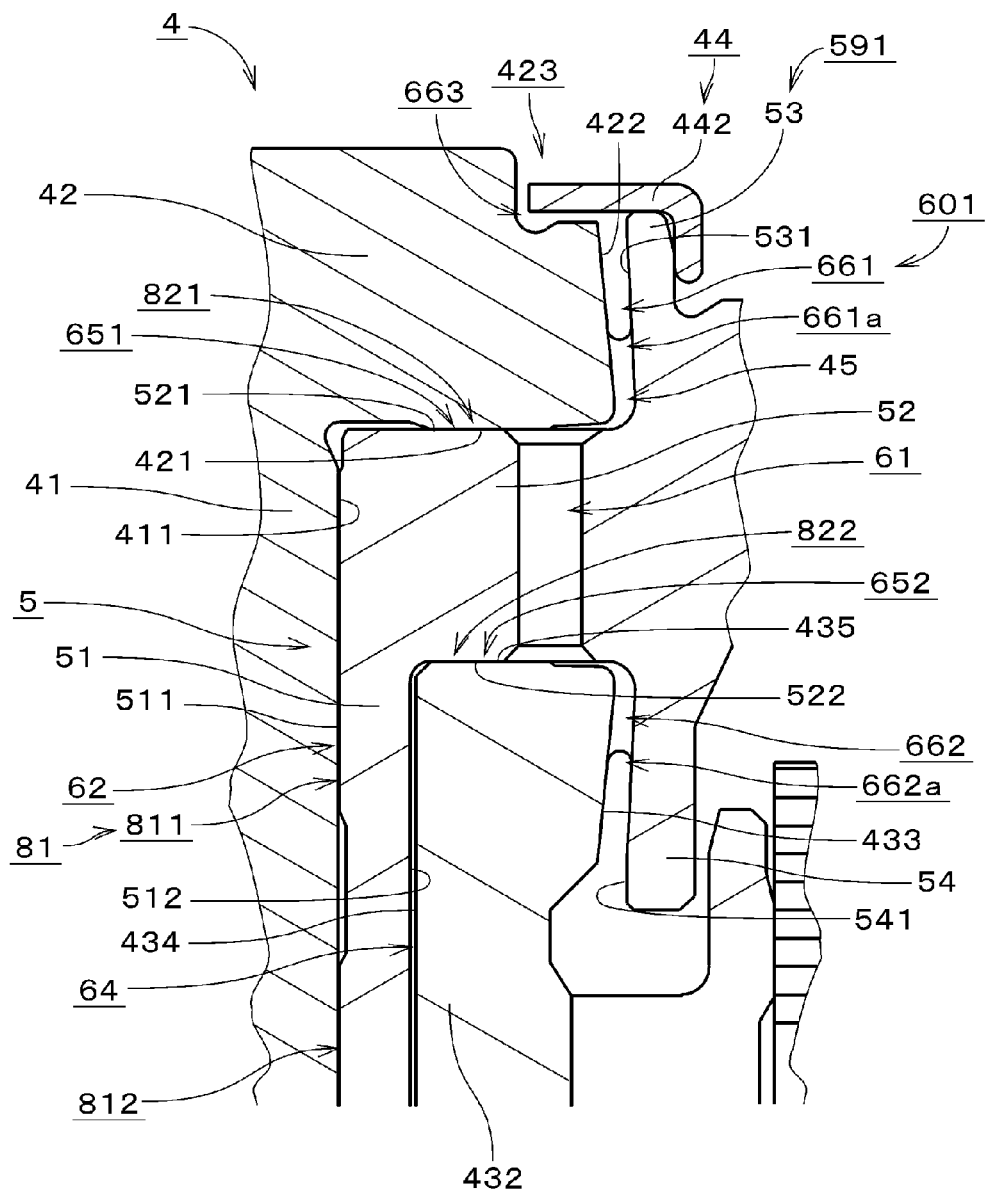
FIG. 4 is a cross-sectional view of the bearing mechanism according to the first preferred embodiment.

FIG. 4 is an enlarged view of an upper portion of the bearing mechanism 4. An outer circumferential surface 411 of the shaft portion 41 is arranged radially opposite the inner circumferential surface 511 of the inner tubular portion 51 of the sleeve portion 5. A radial gap 62 is defined between the shaft portion 41 and the inner tubular portion 51. The radial width of the radial gap 62 is preferably in the range of about 2 μm to about 4 μm. Referring to FIG. 3, an axial gap 63 is defined between a lower end of the inner tubular portion 51 and the lower plate portion 431. Hereinafter, the gap 63 will be referred to as a "lower end gap 63". Note that, in the present preferred embodiment, the radial gap 62 corresponds to a first gap.

Referring to FIG. 4, a gap 64 in the shape of a cylinder is defined between an outer circumferential surface 512 of the inner tubular portion 51 and an inner circumferential surface 434 of the outer tubular portion 432. Hereinafter, the gap 64 will be referred to as a "cylindrical gap 64". Referring to FIG. 3, the cylindrical gap 64 is arranged in communication with the radial gap 62 through the lower end gap 63. The radial width of the cylindrical gap 64 is preferably greater than the radial width of the radial gap 62 and smaller than the diameter of the communicating hole 61. Note that, in the present preferred embodiment, the cylindrical gap 64 corresponds to a second gap.

Referring to FIG. 4, a gap 651 is defined between the upper surface 521 of the flange portion 52 and a lower surface 421 of the upper thrust portion 42. Hereinafter, the gap 651 will be referred to as an "upper thrust gap 651". In addition, a gap 652 is defined between the lower surface 522 of the flange portion 52 and an upper surface 435 of the outer tubular portion 432. Hereinafter, the gap 652 will be referred to as a "lower thrust gap 652". The upper thrust gap 651 and the lower thrust gap 652 are arranged in communication with each other through the communicating hole 61. In the bearing mechanism 4, the radial gap 62, the lower end gap 63, the cylindrical gap 64, the upper thrust gap 651, the lower thrust gap 652, and the communicating hole 61 are preferably arranged from a radial inside to a radial outside in this order. Note that, in the present preferred embodiment, the lower thrust gap 652 corresponds to a third gap, and the upper thrust gap 651 corresponds to a fourth gap.

The inner circumferential surface 531 of the upper hub tubular portion 53 is arranged radially opposite the outer circumferential surface 422 of the upper thrust portion 42. An upper vertical gap 661 continuous with the upper thrust gap 651 is defined between the upper hub tubular portion 53 and the upper thrust portion 42. The upper vertical gap 661 is preferably arranged radially outward of the radial gap 62, the upper thrust gap 651, and the communicating hole 61. The upper vertical gap 661 is arranged to extend upward from the upper thrust gap 651. The upper vertical gap 661 is arranged to gradually increase in width with increasing height, that is, with decreasing distance from an upper end opening of the gap 661. Moreover, the upper vertical gap 661 is arranged to be angled toward the central axis J1, that is, to the left in FIG. 4, with increasing height. An upper surface of the lubricating oil 45 is arranged inside the upper vertical gap 661. Hereinafter, the upper vertical gap 661 will be referred to as an "upper seal gap 661". An upper seal portion 661a arranged to retain the lubricating oil 45 through capillary action is defined in the upper seal gap 661. The inner circumferential surface 531 and the outer circumferential surface 422 are preferably coated with oil-repellent films above the surface of the lubricating oil 45 in the upper seal gap 661. The upper end opening of the upper seal gap 661 is covered with the cap cover portion 442 of the seal cap 44. The cap cover portion 442 is arranged to extend radially inward from the upper hub tubular portion 53.

A gap 663 is defined between a combination of the bottom surface and a side surface of the shoulder portion 423 of the upper thrust portion 42 and a combination of a lower surface and a radially inner edge of the cap cover portion 442. The upper seal gap 661 and an outside of the bearing mechanism 4 are arranged in communication with each other through the gap 663. Hereinafter, the upper seal gap 661 and the gap 663 will be collectively referred to as a "fifth gap 601". In addition, the seal cap 44 and the upper hub tubular portion 53, which are arranged above the outer edge portion of the flange portion 52, will be collectively referred to as an "upper hub annular portion 591". Each of the upper hub tubular portion 53 and the seal cap 44 defines a portion of the rotating portion 3.

The inner circumferential surface 541 of the lower hub tubular portion 54 are arranged radially opposite the inclined surface 433 of the outer tubular portion 432. A lower vertical gap 662 continuous with the lower thrust gap 652 is defined between the lower hub tubular portion 54 and the outer tubular portion 432. The lower vertical gap 662 corresponds to a sixth gap. The lower vertical gap 662 is arranged to extend downward from the lower thrust gap 652. The lower vertical gap 662 is preferably arranged radially outward of the radial gap 62, the lower end gap 63, the cylindrical gap 64, the lower thrust gap 652, and the communicating hole 61. The radial width of the lower vertical gap 662 is arranged to gradually increase with decreasing height, that is, with decreasing distance from a lower end opening of the gap 662. Moreover, the lower vertical gap 662 is arranged to be angled to the left in FIG. 4 with decreasing height. A lower surface of the lubricating oil 45 is arranged inside the lower vertical gap 662. Hereinafter, the lower vertical gap 662 will be referred to as a "lower seal gap 662". A lower seal portion 662a arranged to retain the lubricating oil 45 through capillary action is defined in the lower seal gap 662. The inner circumferential surface 541 and the inclined surface 433 are coated with oil-repellent films below the surface of the lubricating oil 45 in the lower seal gap 662. In the bearing mechanism 4, the upper seal gap 661 and the lower seal gap 662 are arranged in communication with each other through the communicating hole 61.

The axial distance between the surface of the lubricating oil 45 in the upper seal portion 661a and the surface of the lubricating oil 45 in the lower seal portion 662a is shorter than the axial length of the radial gap 62. Moreover, the length of the communicating hole 61 is shorter than the axial distance between the surface of the lubricating oil 45 in the upper seal portion 661a and the surface of the lubricating oil 45 in the lower seal portion 662a. It is assumed here that the distance between the surface of the lubricating oil 45 in the upper seal portion 661a and the surface of the lubricating oil 45 in the lower seal portion 662a refers to the distance between an upper end of the surface of the lubricating oil 45 in the upper seal portion 661a and a lower end of the surface of the lubricating oil 45 in the lower seal portion 662a.

Referring to FIG. 3, the radially outside diameter of the upper seal gap 661 is preferably substantially equal to the radially outside diameter of the lower seal gap 662. This makes it possible to arrange the communicating hole 61 to extend in parallel or substantially in parallel with the central axis J1. It is assumed here that the outside diameter of the upper seal gap 661 refers to the outside diameter of an end of the upper seal gap 661 on a side closer to an upper thrust dynamic pressure bearing portion, and that the outside diameter of the lower seal gap 662 refers to the outside diameter of an end of the lower seal gap 662 on a side closer to a lower thrust dynamic pressure bearing portion.

In the bearing mechanism 4, the communicating hole 61 and a space 6 ranging from the upper seal gap 661 to the lower seal gap 662 through the upper thrust gap 651, the radial gap 62, the lower end gap 63, the cylindrical gap 64, and the lower thrust gap 652 are continuously filled with the lubricating oil 45. When the bearing mechanism 4 is constructed, the lubricating oil 45 is fed into the bearing mechanism 4 through the lower seal gap 662 with the lower seal gap 662 arranged to face axially upward in the direction of gravity. It is possible to control the amount of the lubricating oil 45 by visually identifying the height of the surface of the lubricating oil 45 in the lower seal gap 662.

Note that the visual identification may be conducted either with eyes alone or with a magnified view of the lower seal gap 662 with the aid of a device such as, for example, a microscope. Also note that the visual identification may be conducted with a magnified image of the lower seal gap 662 shown on a screen with the aid of a device.

Figure 5:
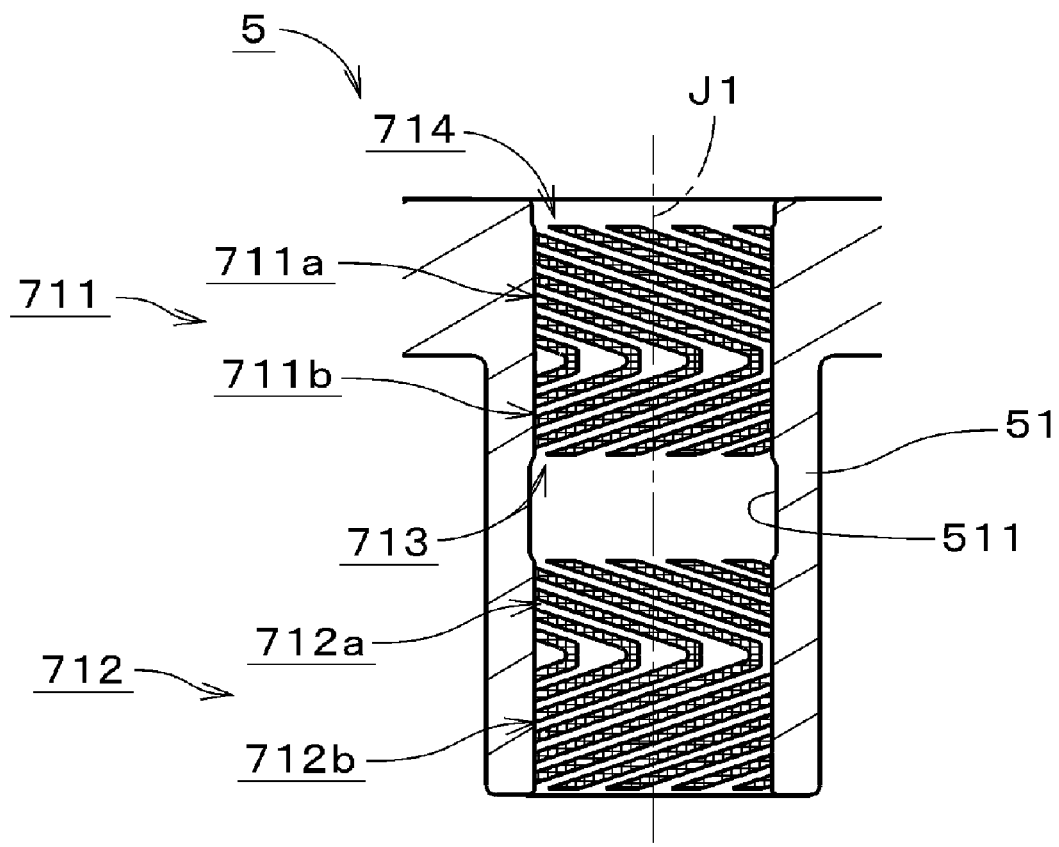
FIG. 5 is a cross-sectional view of a sleeve portion according to the first preferred embodiment.

FIG. 5 is a cross-sectional view of the sleeve portion 5. In FIG. 5, the shape of the sleeve portion 5 beyond a cross section thereof is also depicted. The inner tubular portion 51 includes an upper radial dynamic pressure groove array 711 and a lower radial dynamic pressure groove array 712 defined in the inner circumferential surface 511 thereof. The upper radial dynamic pressure groove array 711 is arranged on an upper side of a substantial axial middle of the inner circumferential surface 511. The lower radial dynamic pressure groove array 712 is arranged on a lower side of the substantial axial middle of the inner circumferential surface 511. In FIG. 5, dynamic pressure grooves are indicated by cross-hatching. Also in other figures referenced below, dynamic pressure grooves are indicated by cross-hatching. The upper radial dynamic pressure groove array 711 is defined by a collection of grooves arranged in, for example, a herringbone pattern, that is, a collection of a plurality of grooves each of which is arranged substantially in the shape of the letter "V" in horizontal orientation along a circumferential direction of the inner circumferential surface 511 of the inner tubular portion 51. The axial dimension of an upper portion of the upper radial dynamic pressure groove array 711 is preferably arranged to be greater than that of a lower portion of the upper radial dynamic pressure groove array 711. Hereinafter, the upper portion and the lower portion of the upper radial dynamic pressure groove array 711 will be referred to as a "groove upper portion 711a" and a "groove lower portion 711b", respectively. The lower radial dynamic pressure groove array 712 is also defined by grooves arranged in the herringbone pattern. The axial dimension of a groove upper portion 712a of the lower radial dynamic pressure groove array 712 is arranged to be smaller than that of a groove lower portion 712b of the lower radial dynamic pressure groove array 712.

The lower thrust gap 652 illustrated in FIG. 4 is arranged at a level higher than that of an upper end of the groove upper portion 712a of the lower radial dynamic pressure groove array 712. In the radial gap 62, a radial dynamic pressure bearing 81 arranged to generate a radial fluid dynamic pressure acting on the lubricating oil 45 is defined through the upper and lower radial dynamic pressure groove arrays 711 and 712. Hereinafter, an upper dynamic pressure bearing portion corresponding to the upper radial dynamic pressure groove array 711 will be referred to as an "upper radial dynamic pressure bearing portion 811", while a lower dynamic pressure bearing portion corresponding to the lower radial dynamic pressure groove array 712 will be referred to as a "lower radial dynamic pressure bearing portion 812". The lower radial dynamic pressure bearing portion 812 is arranged to overlap in a radial direction with a fixing region 436 where the lower portion of the outer circumferential surface of the outer tubular portion 432 and the holder 211 of the base plate 21 illustrated in FIG. 3 are fixed to each other.

Note that it is enough that the level of the lower thrust gap 652 should be arranged to be higher than that of the upper end of at least one of the dynamic pressure grooves constituting the lower radial dynamic pressure groove array 712. Also note that the level of the lower thrust gap 652 may be arranged to be higher than that of the upper end of each of all the dynamic pressure grooves constituting the lower radial dynamic pressure groove array 712. These arrangements fall within the scope of preferred embodiments of the present invention.

Figure 6:
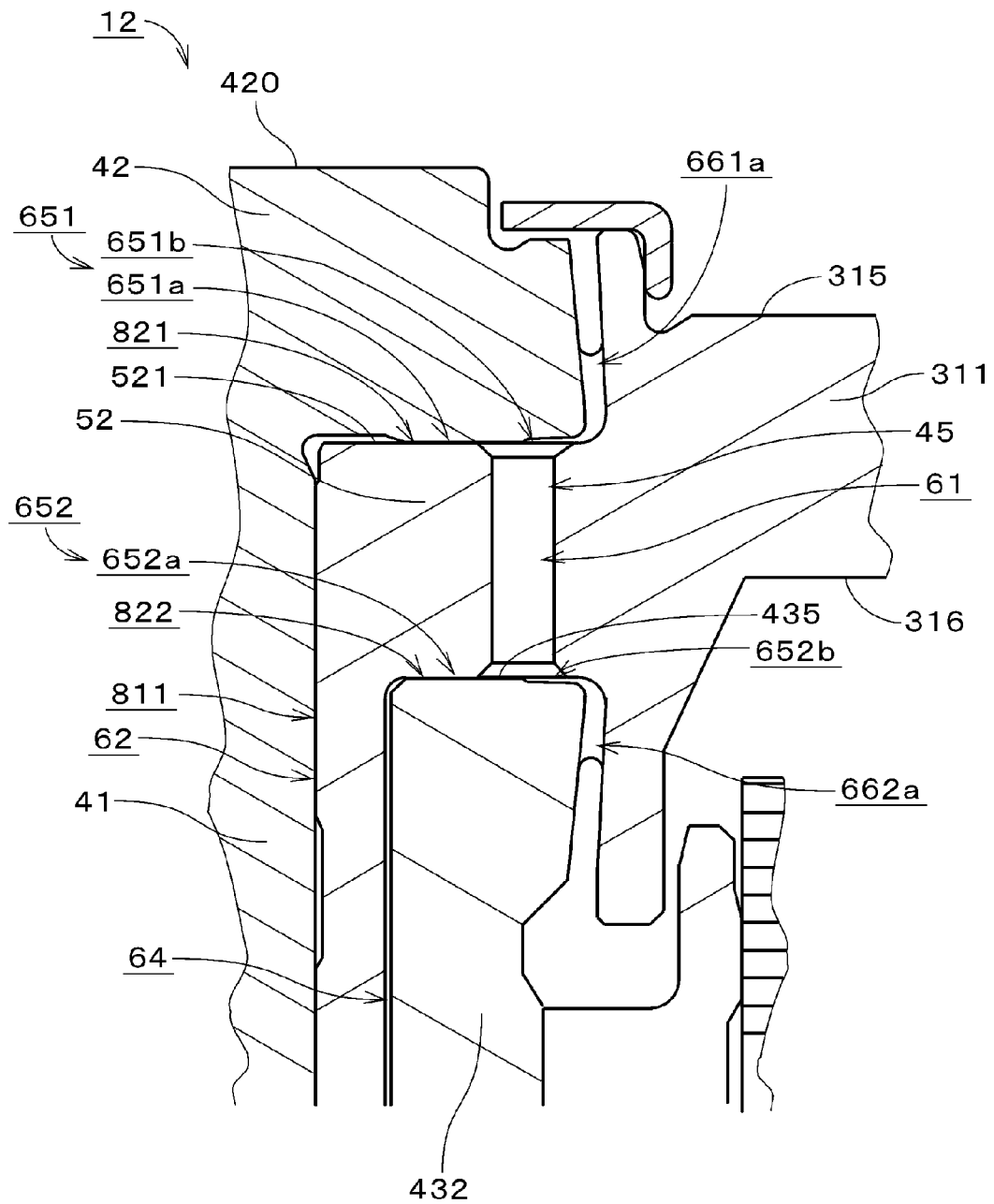
FIG. 6 is a cross-sectional view of the bearing mechanism according to the first preferred embodiment.

Referring to FIG. 6, in the motor 12, an upper surface 420 of the upper thrust portion 42, an upper surface 315 of the cover portion 311, the upper surface 521 of the flange portion 52, a lower surface 316 of the cover portion 311, and the upper surface 435 of the outer tubular portion 432 are arranged at increasingly lower levels in this order.

Figure 7:
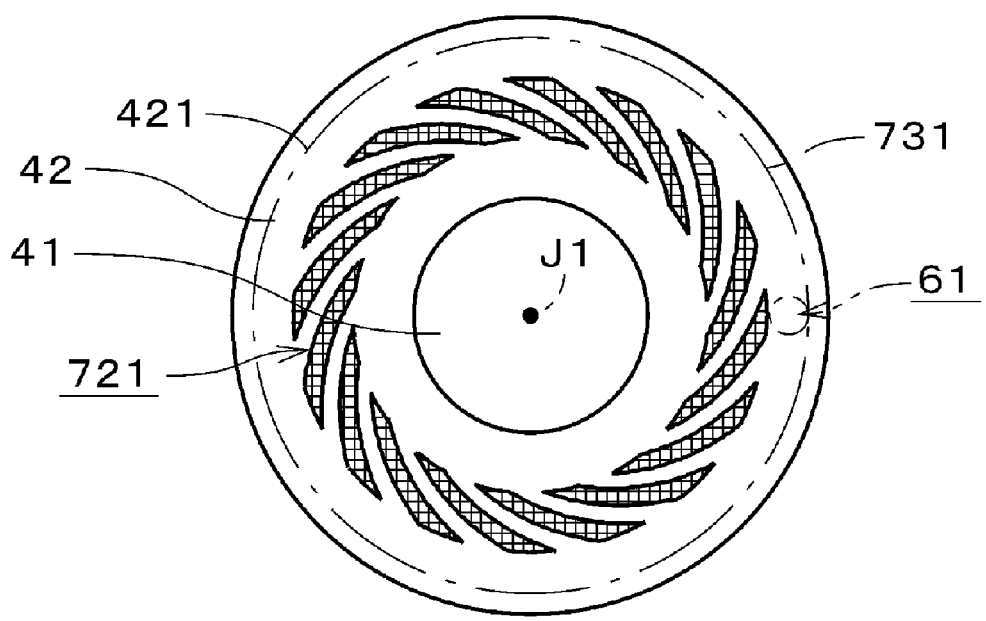
FIG. 7 is a bottom view of a shaft portion and an upper thrust portion according to the first preferred embodiment.

FIG. 7 is a bottom view of the shaft portion 41 and the upper thrust portion 42. In FIG. 7, a position corresponding to the communicating hole 61 is indicated by a chain double-dashed line. The same holds true for FIG. 8. The lower surface 421 of the upper thrust portion 42 includes an upper thrust dynamic pressure groove array 721 arranged in a spiral pattern defined therein. The upper thrust dynamic pressure groove array 721 is arranged radially inward of a circle 731 which is centered on the central axis J1 and which touches an upper end opening of the communicating hole 61 at a radially outer point. Note that, in the case where the upper end opening is provided with a chamfer, the upper thrust dynamic pressure groove array 721 is arranged radially inward of a circle which is centered on the central axis J1 and which touches the chamfer at a radially outer point. In the case of FIG. 7, the upper thrust dynamic pressure groove array 721 is arranged radially inward of the upper end opening of the communicating hole 61. In the upper thrust gap 651 illustrated in FIG. 4, a dynamic pressure bearing portion 821, which is a dynamic pressure generation portion arranged to generate a fluid dynamic pressure acting on the lubricating oil 45 in a thrust direction, is defined through the upper thrust dynamic pressure groove array 721. Hereinafter, the dynamic pressure bearing portion 821 will be referred to as an "upper thrust dynamic pressure bearing portion 821".

Figure 8:
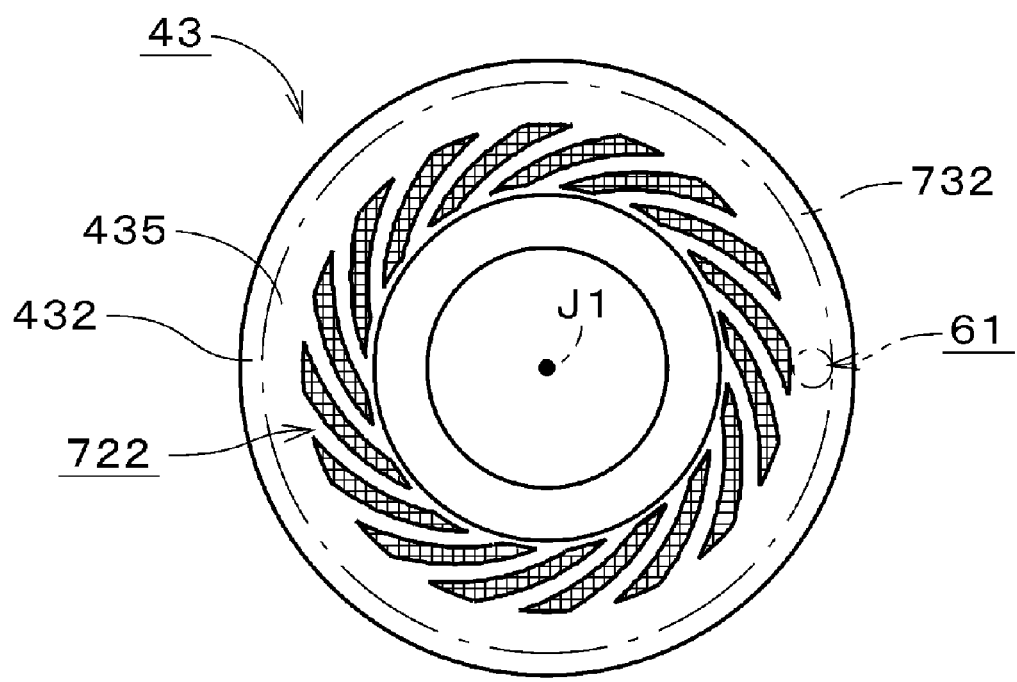
FIG. 8 is a plan view of a lower thrust portion according to the first preferred embodiment.

FIG. 8 is a plan view of the lower thrust portion 43. The upper surface 435 of the outer tubular portion 432 includes a lower thrust dynamic pressure groove array 722 arranged in the spiral pattern defined therein. The lower thrust dynamic pressure groove array 722 is arranged radially inward of a circle 732 which is centered on the central axis J1 and which touches a lower end opening of the communicating hole 61 at a radially outer point. Note that, in the case where the lower end opening is provided with a chamfer, the lower thrust dynamic pressure groove array 722 is arranged radially inward of a circle which is centered on the central axis J1 and which touches the chamfer at a radially outer point. In the case of FIG. 8, the lower thrust dynamic pressure groove array 722 is arranged radially inward of the lower end opening of the communicating hole 61. In the lower thrust gap 652 illustrated in FIG. 4, a dynamic pressure bearing portion 822, which is a dynamic pressure generation portion arranged to generate a fluid dynamic pressure acting on the lubricating oil 45 in the thrust direction, is defined through the lower thrust dynamic pressure groove array 722. Hereinafter, the dynamic pressure bearing portion 822 will be referred to as a "lower thrust dynamic pressure bearing portion 822".

While the motor 12 is driven, the inner tubular portion 51 of the sleeve portion 5 is supported by the radial dynamic pressure bearing 81 in the radial direction with respect to the shaft portion 41, while the flange portion 52 is supported by a thrust dynamic pressure bearing defined by the upper thrust dynamic pressure bearing portion 821 and the lower thrust dynamic pressure bearing portion 822 in the thrust direction with respect to the upper thrust portion 42 and the outer tubular portion 432.

At this time, each of the upper and lower radial dynamic pressure groove arrays 711 and 712 illustrated in FIG. 5 generates a dynamic pressure by pumping the lubricating oil 45 to a middle portion thereof. As described above, the groove lower portion 711b of the upper radial dynamic pressure groove array 711 is arranged to be shorter than the groove upper portion 711a thereof, while the groove upper portion 712a of the lower radial dynamic pressure groove array 712 is arranged to be shorter than the groove lower portion 712b thereof. The radial dynamic pressure bearing 81 as a whole is arranged to generate little pressure acting on the lubricating oil 45 in the vertical direction.

Meanwhile, in the upper thrust gap 651 illustrated in FIG. 6, a pressure acting on the lubricating oil 45 in the direction of the shaft portion 41 is generated by the upper thrust dynamic pressure bearing portion 821 in an inner region 651a radially inward of an outer circumference of the upper thrust dynamic pressure groove array 721. The pressure on the lubricating oil 45 is thereby increased in a axially upper portion of the radial gap 62 and a radially inner portion of the upper thrust gap 651, whereby generation of an air bubble is prevented therein. Pressure in an outer region 651b is thus preferably substantially equal to the atmospheric pressure. The outer region 651b is arranged radially outward of the outer circumference of the upper thrust dynamic pressure groove array 721.

In the lower thrust gap 652, a pressure acting on the lubricating oil 45 in the direction of the cylindrical gap 64 is generated in an inner region 652a radially inward of an outer circumference of the lower thrust dynamic pressure groove array 722. Pressure in an outer region 652b is substantially equal to the atmospheric pressure. The outer region 652b is arranged radially outward of the outer circumference of the lower thrust dynamic pressure groove array 722. The pressure on the lubricating oil 45 is increased in an axially lower portion of the radial gap 62, the lower end gap 63, the cylindrical gap 64, and a radially inner portion of the lower thrust gap 652, whereby generation of an air bubble is prevented in the cylindrical gap 64 and the lower end gap 63 illustrated in FIG. 3. As described above, in the motor 12, a pressure is applied to the lubricating oil 45 throughout an entire circulation channel of the lubricating oil 45 except for the communicating hole 61, so that a sufficient bearing performance of the bearing mechanism 4 is ensured. In addition, the upper end opening of the communicating hole 61 is arranged in the outer region 651b of the upper thrust gap 651, while the lower end opening of the communicating hole 61 is arranged in the outer region 652b of the lower thrust gap 652. Accordingly, in a channel ranging from the upper seal portion 661a to the lower seal portion 662a through the communicating hole 61, a difference in pressure owing to the upper and lower thrust dynamic pressure bearing portions 821 and 822 is prevented from occurring.

In the motor 12, the axial distance between the surface of the lubricating oil 45 in the upper seal portion 661a and the surface of the lubricating oil 45 in the lower seal portion 662a is shorter than the axial length of the radial dynamic pressure bearing 81. The axial length of the radial dynamic pressure bearing 81 refers to the distance between an upper end and a lower end of the radial dynamic pressure bearing 81. More specifically, the axial length of the radial dynamic pressure bearing 81 refers to the distance between an upper end of the groove upper portion 711a of the upper radial dynamic pressure groove array 711 and a lower end of the groove lower portion 712b of the lower radial dynamic pressure groove array 712. Note that a portion that does not contribute to the function of the dynamic pressure bearing may exist between the upper and lower ends. The same holds true for other preferred embodiments of the present invention described below. A reduction in a difference in pressure between the upper seal portion and the lower seal portion 661a and 662a is achieved by arranging the upper seal portion and the lower seal portion 661a and 662a to be closer to each other in the axial direction as described above. This facilitates a prevention of any leakage of the lubricating oil 45.

Moreover, the axial length of the communicating hole is shorter than the axial distance between the upper seal portion and the lower seal portion 661a and 662a. This contributes to reducing the amount of the lubricating oil 45 arranged in the communicating hole 61, and at the same time to reducing channel resistance. A reduction in a difference in pressure between the upper and lower seal gaps 661 and 662 owing to influence of channel resistance and gravity acting on the lubricating oil 45 in the communicating hole 61 is achieved. This contributes to reducing movement of the lubricating oil 45 between the upper and lower seal gaps 661 and 662, and further prevents leakage of the lubricating oil 45.

Furthermore, the cylindrical gap 64, which corresponds to the second gap, is arranged to be in communication with a lower portion of the radial gap 62, which corresponds to the first gap, while at the same time the lower thrust gap 652, which corresponds to the third gap, is arranged axially above the lower radial dynamic pressure bearing portion 812. This arrangement makes it possible to arrange the lower thrust gap 652 to be closer to the upper thrust gap 651, which corresponds to the fourth gap, thereby reducing the length of the communicating hole 61, which is arranged to make the upper and lower thrust gaps 651 and 652 in communication with each other. As a result, the upper seal portion and the lower seal portion 661a and 662a are arranged to be closer to each other.

The communicating hole 61 is arranged to extend in parallel or substantially in parallel with the central axis J1 to reduce a difference between the distance from the upper end opening of the communicating hole 61 to the upper seal gap 661 and the distance from the lower end opening of the communicating hole 61 to the lower seal gap 662. This arrangement contributes to further reducing the difference in pressure between the upper seal gap 661 and the lower seal gap 662.

Furthermore, each of the upper seal gap 661 and the lower seal gap 662 is angled at an angle to the central axis J1. Therefore, during rotation of the motor 12, the lubricating oil 45 is pressed inward in each of the upper seal gap 661 and the lower seal gap 662 through a centrifugal force. This contributes to preventing leakage of the lubricating oil 45. As a result, designing of the motor 12 is made easier.

Figure 9:
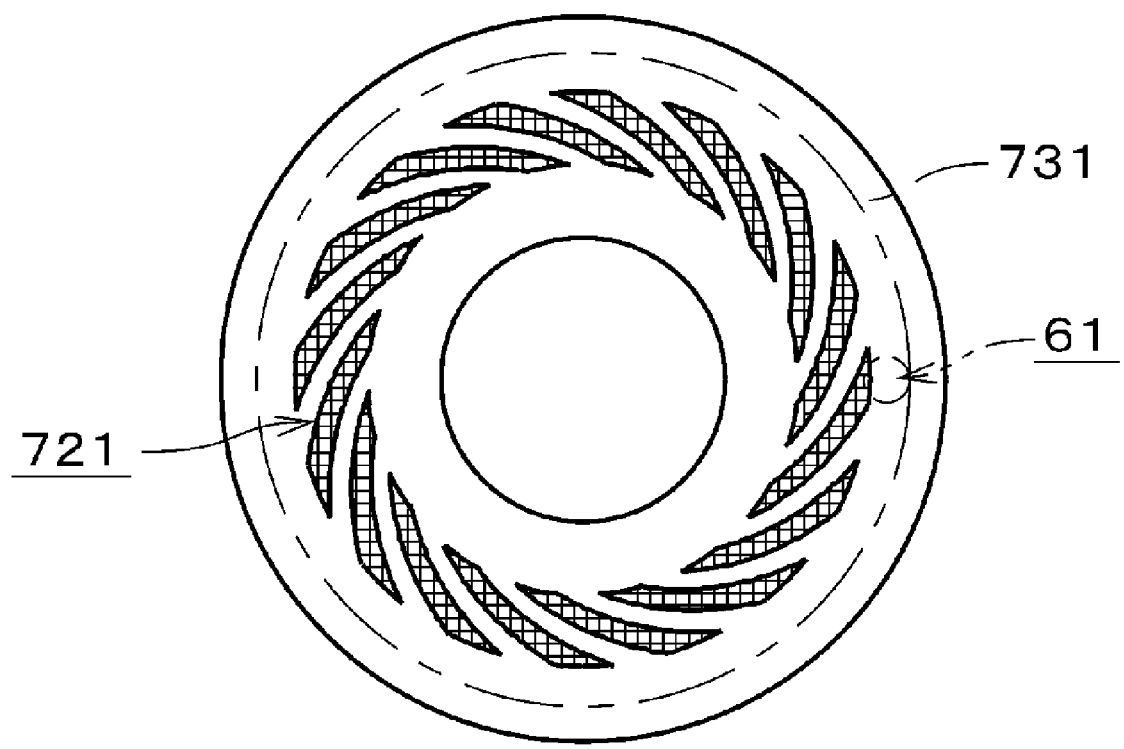
FIG. 9 is a bottom view of a shaft portion and an upper thrust portion according to another preferred embodiment of the present invention.
Figure 10:
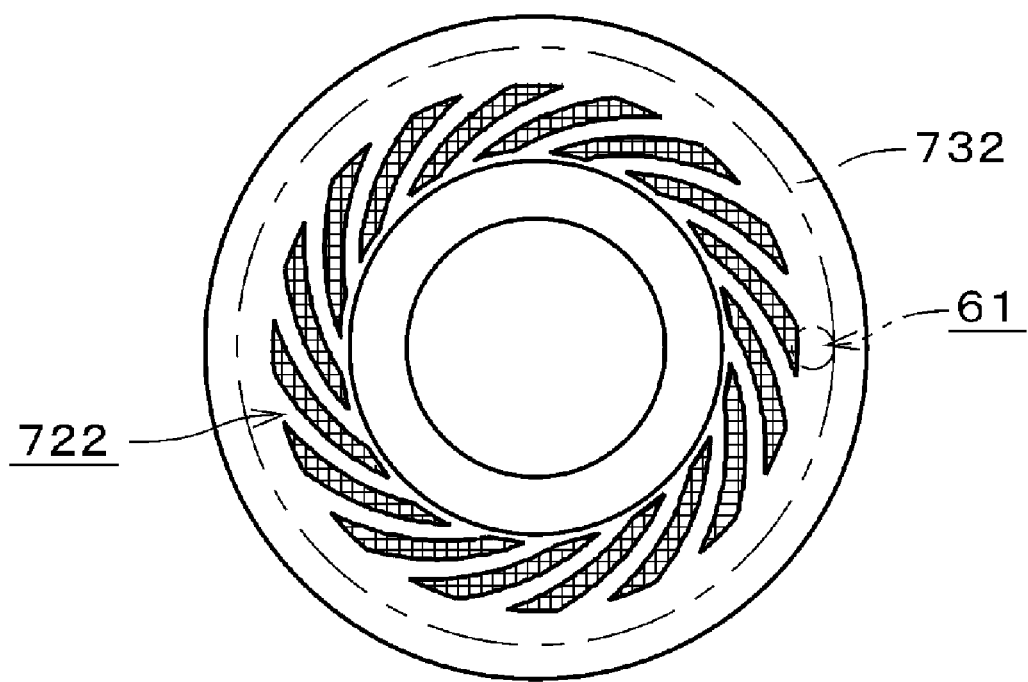
FIG. 10 is a plan view of a lower thrust portion according to another preferred embodiment of the present invention.

In a modification of the motor 12 according to the present preferred embodiment, a structure illustrated in FIG. 9 may be adopted as long as the pressure in the outer region 651b of the upper thrust gap 651 is maintained at a value substantially equal to the atmospheric pressure while the motor 12 is driven. More specifically, in a region radially inward of the circle 731 which is centered on the central axis J1 and which touches the upper end opening of the communicating hole 61 at the radially outer point, an outer circumferential portion of the upper thrust dynamic pressure groove array 721 may be arranged to overlap with the upper end opening of the communicating hole 61. In this case, the upper thrust dynamic pressure groove array 721 is arranged to extend radially outward to such an extent that the outer circumferential portion of the upper thrust dynamic pressure groove array 721 radially overlaps with the communicating hole 61 in plan view. As a result, a thrust dynamic pressure is efficiently obtained in the upper thrust dynamic pressure bearing portion 821, and a portion of the flange portion 52 which is in the vicinity of an outer edge thereof is supported by the upper thrust dynamic pressure bearing portion 821. This contributes to more a stable support of the sleeve portion 5. Similarly, a structure illustrated in FIG. 10 may be adopted as long as the pressure in the outer region 652b of the lower thrust gap 652 is maintained at a value substantially equal to the atmospheric pressure while the motor 12 is driven. More specifically, in a region radially inward of the circle 732 which is centered on the central axis J1 and which touches the lower end opening of the communicating hole 61 at the radially outer point, an outer circumferential portion of the lower thrust dynamic pressure groove array 722 may be arranged to overlap with the lower end opening of the communicating hole 61.

Even when the upper thrust dynamic pressure groove array 721 is arranged to overlap with the upper end opening of the communicating hole 61, and the lower thrust dynamic pressure groove array 722 is arranged to overlap with the lower end opening of the communicating hole 61, a difference in pressure between an interior and an exterior of the communicating hole 61 is eliminated at a region where the upper thrust dynamic pressure groove array 721 or the lower thrust dynamic pressure groove array 722 is not provided. As a result, a reduction in the difference in pressure between the upper seal portion 661a and the lower seal portion 662a is achieved.

Note that it is enough that at least one of the dynamic pressure grooves defining the upper thrust dynamic pressure groove array 721 should be arranged radially inward of the circle 731 which is centered on the central axis J1 and which touches the upper end opening of the communicating hole 61 at the radially outer point. Also note that all of the dynamic pressure grooves defining the upper thrust dynamic pressure groove array 721 may be arranged radially inward of the circle 731. These arrangements fall within the scope of preferred embodiments of the present invention.

Similarly, note that it is enough that at least one of the dynamic pressure grooves constituting the lower thrust dynamic pressure groove array 722 should be arranged radially inward of the circle 732 which is centered on the central axis J1 and which touches the lower end opening of the communicating hole 61 at the radially outer point. Also note that all of the dynamic pressure grooves defining the lower thrust dynamic pressure groove array 722 may be arranged radially inward of the circle 732. These arrangements fall within the scope of preferred embodiments of the present invention.

In the motor 12, the lower thrust gap 652 is arranged in the upper portion of the bearing mechanism 4. Accordingly, a space is secured below the lower thrust gap 652, and the fixing region 436 where the outer tubular portion 432 and the base plate 21 are fixed to each other can be arranged in this space. This enables the fixing region 436 to have a sufficient axial dimension. In the motor 12, a greater axial length of the radial gap 62 is preferred because an increase in the axial length of the radial dynamic pressure bearing 81 can thereby be achieved, and an improvement in rigidity of the bearing mechanism 4 against an external force acting in such a direction as to tilt the rotating portion 3 can also be achieved. The fixing region 436 is arranged to overlap with at least a portion of the lower radial dynamic pressure bearing portion 812 in the radial direction. As a result, both an increase in the axial length of the radial gap 62 and an increase in the axial dimension of the fixing region 436 are achieved. Moreover, surroundings of a lower portion of the radial dynamic pressure bearing 81 are surrounded by the base plate 21. This results in an increased rigidity of the surroundings of the lower portion of the radial dynamic pressure bearing 81. Moreover, a reduction in the thickness of the motor 12 as a whole in a direction parallel to the central axis J1 is achieved.

Because the shaft portion 41 and the upper thrust portion 42 are defined by a single continuous monolithic member, and because the lower plate portion 431 and the outer tubular portion 432 are defined by a single continuous monolithic member, a reduction in the number of components of the motor 12 is achieved. It is easy to define the communicating hole 61 in the sleeve portion 5 because the communicating hole 61 is arranged to have a small axial length and extend in parallel or substantially in parallel with the central axis J1. A reduction in the total amount of the lubricating oil 45 is also achieved. Note that the diameter of the communicating hole 61 may be reduced to as small as the width of the cylindrical gap 64 in order to achieve an additional reduction in the amount of the lubricating oil 45.

Figure 11:
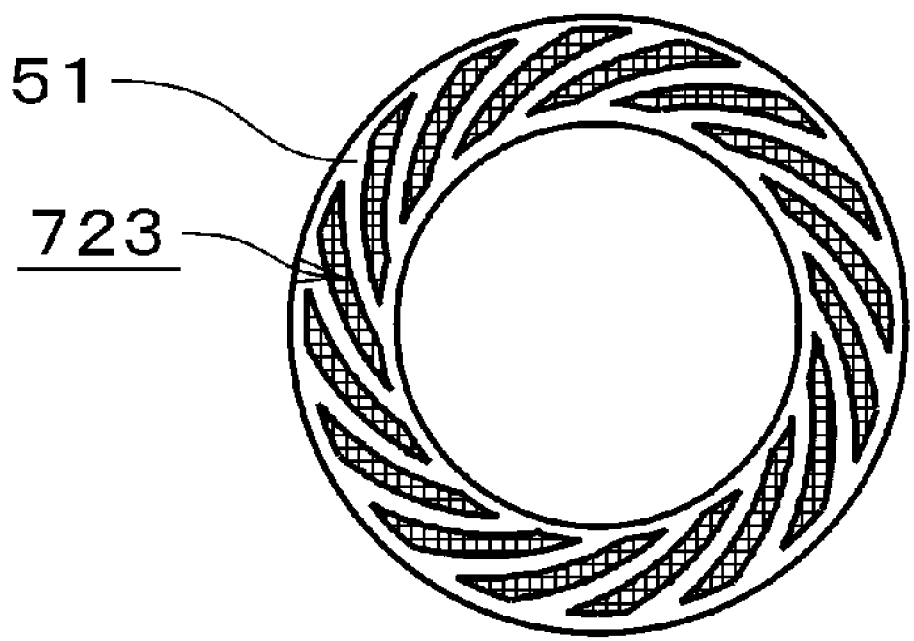
FIG. 11 is a bottom view of an inner tubular portion of a bearing mechanism according to another preferred embodiment of the present invention.

FIG. 11 is a bottom view of the inner tubular portion 51. Referring to FIG. 11, in the motor 12, a lower surface of the inner tubular portion 51 may include a thrust dynamic pressure groove array 723 defined therein. As a result, a thrust dynamic pressure bearing portion arranged to support the inner tubular portion 51 in the thrust direction is defined in the lower end gap 63 illustrated in FIG. 3. In this case, a dynamic pressure generation portion that functions as a thrust dynamic pressure bearing portion is not necessarily required to be arranged in the lower thrust gap 652. Note, however, that it is preferable that a dynamic pressure groove array which defines a dynamic pressure generation portion arranged to induce a radially inward pressure acting on the lubricating oil 45 should be arranged in the lower thrust gap. In the case of the structure illustrated in FIG. 11, the axial width of the lower thrust gap is preferably arranged to be greater than that of the lower end gap. The same holds true for a second preferred embodiment of the present invention described below.

Figure 12:
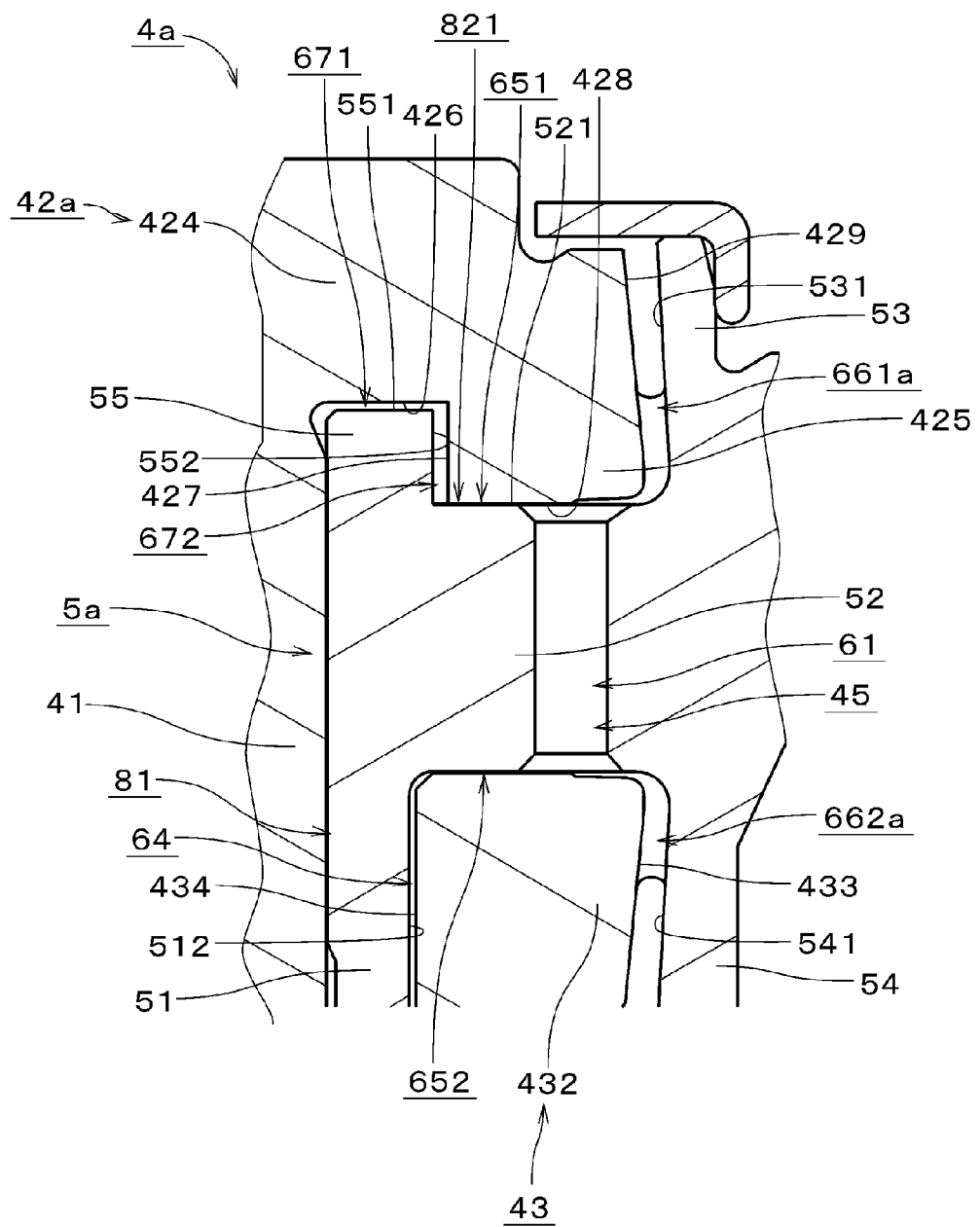
FIG. 12 is a cross-sectional view of a bearing mechanism in a motor according to a second preferred embodiment of the present invention.

FIG. 12 is a diagram illustrating a portion of a bearing mechanism 4a in a motor according to the second preferred embodiment of the present invention. A sleeve portion 5a of the bearing mechanism 4a includes an upper inner tubular portion 55, which is annular and arranged to extend axially upward from a radially inner portion of the flange portion 52. Hereinafter, the inner tubular portion 51, which is arranged below the flange portion 52, will be referred to as a "lower inner tubular portion 51" when distinguished from the upper inner tubular portion 55. An upper thrust portion 42a includes an upper plate portion 424 and an upper outer tubular portion 425. The upper plate portion 424 is arranged to spread radially outward from the upper portion of the shaft portion 41. The upper outer tubular portion 425 is arranged to extend downward from an outer edge portion of the upper plate portion 424. Hereinafter, the outer tubular portion 432 will be referred to as a "lower outer tubular portion 432" when distinguished from the upper outer tubular portion 425. The bearing mechanism 4a is otherwise similar in structure to the bearing mechanism 4 in the motor 12 according to the first preferred embodiment. Note that like members or portions are designated by like reference numerals in the following description.

A gap 671 is defined between an upper surface 551 of the upper inner tubular portion 55 and a lower surface 426 of the upper plate portion 424 in the axial direction, i.e., in the vertical direction in FIG. 12. Hereinafter, the gap 671 will be referred to as an "upper end gap 671". In addition, a cylindrical gap 672 is defined between an outer circumferential surface 552 of the upper inner tubular portion 55 and an inner circumferential surface 427 of the upper outer tubular portion 425 in the radial direction. Hereinafter, the gap 672 will be referred to as an "upper cylindrical gap 672". Hereinafter, the cylindrical gap 64, which is defined between the outer circumferential surface 512 of the lower inner tubular portion 51 and the inner circumferential surface 434 of the lower outer tubular portion 432, will be referred to as a "lower cylindrical gap 64" when distinguished from the upper cylindrical gap 672.

An upper thrust dynamic pressure groove array 721 similar to that illustrated in FIG. 7 is defined in a lower surface 428 of the upper outer tubular portion 425 of the upper thrust portion 42a. As a result, the upper thrust dynamic pressure bearing portion 821 is defined in the upper thrust gap 651 between the lower surface 428 of the upper outer tubular portion 425 and the upper surface 521 of the flange portion 52. In the bearing mechanism 4a, the upper thrust dynamic pressure bearing portion 821 and the radial dynamic pressure bearing 81 are arranged in communication with each other through the upper cylindrical gap 672 and the upper end gap 671.

The upper seal portion 661a is defined between an outer circumferential surface 429 of the upper outer tubular portion 425 and the inner circumferential surface 531 of the upper hub tubular portion 53. The lower seal portion 662a is defined between the inclined surface 433 of the lower outer tubular portion 432 and the inner circumferential surface 541 of the lower hub tubular portion 54. The upper seal portion 661a and the lower seal portion 662a are arranged in communication with each other through the communicating hole 61. The axial distance between the upper end of the surface of the lubricating oil 45 in the upper seal portion 661a and the lower end of the surface of the lubricating oil 45 in the lower seal portion 662a is preferably longer than the length of the communicating hole and shorter than the length of the radial dynamic pressure bearing 81.

Also in the second preferred embodiment, the axial distance between the surface of the lubricating oil 45 in the upper seal portion 661a and the surface of the lubricating oil 45 in the lower seal portion 662a is shorter than the length of the radial dynamic pressure bearing 81. This arrangement contributes to reducing the difference in pressure between the upper seal portion 661a and the lower seal portion 662a. This contributes to preventing leakage of the lubricating oil 45. Furthermore, the length of the communicating hole 61 being shorter than the distance between the upper seal portion 661a and the lower seal portion 662a makes it easier to prevent any leakage of the lubricating oil 45.

Providing the upper cylindrical gap 672 and the lower cylindrical gap 671 contributes to reducing the length of the communicating hole 61. The reduced length of the communicating hole 61 contributes to arranging the upper seal portion 661a and the lower seal portion 662a to be closer to each other, whereby leakage of the lubricating oil 45 is more easily prevented. Moreover, the upper end gap 671 and the upper cylindrical gap 672 are arranged between the upper thrust dynamic pressure bearing portion 821 and the radial dynamic pressure bearing 81. This arrangement contributes to an increased pressure on the lubricating oil 45 in the upper end gap 671 and the upper cylindrical gap 672, whereby generation of an air bubble is prevented.

In the bearing mechanism 4a, the upper surface 551 of the upper inner tubular portion 55 may include a thrust dynamic pressure groove array similar to the thrust dynamic pressure groove array 723 illustrated in FIG. 11 defined therein. This results in a thrust dynamic pressure bearing portion being defined in the upper end gap 671 to support the upper inner tubular portion 55 in the thrust direction. In this case, a dynamic pressure generation portion that functions as an upper thrust dynamic pressure bearing portion may not necessarily be arranged in the upper thrust gap 651. Note, however, that it is preferable that a dynamic pressure groove array which defines a dynamic pressure generation portion arranged to produce a radially inward pressure acting on the lubricating oil 45 should be arranged in the upper thrust gap 651. The axial width of the upper end gap 671 is preferably greater than that of the upper thrust gap 651.

Figure 13:
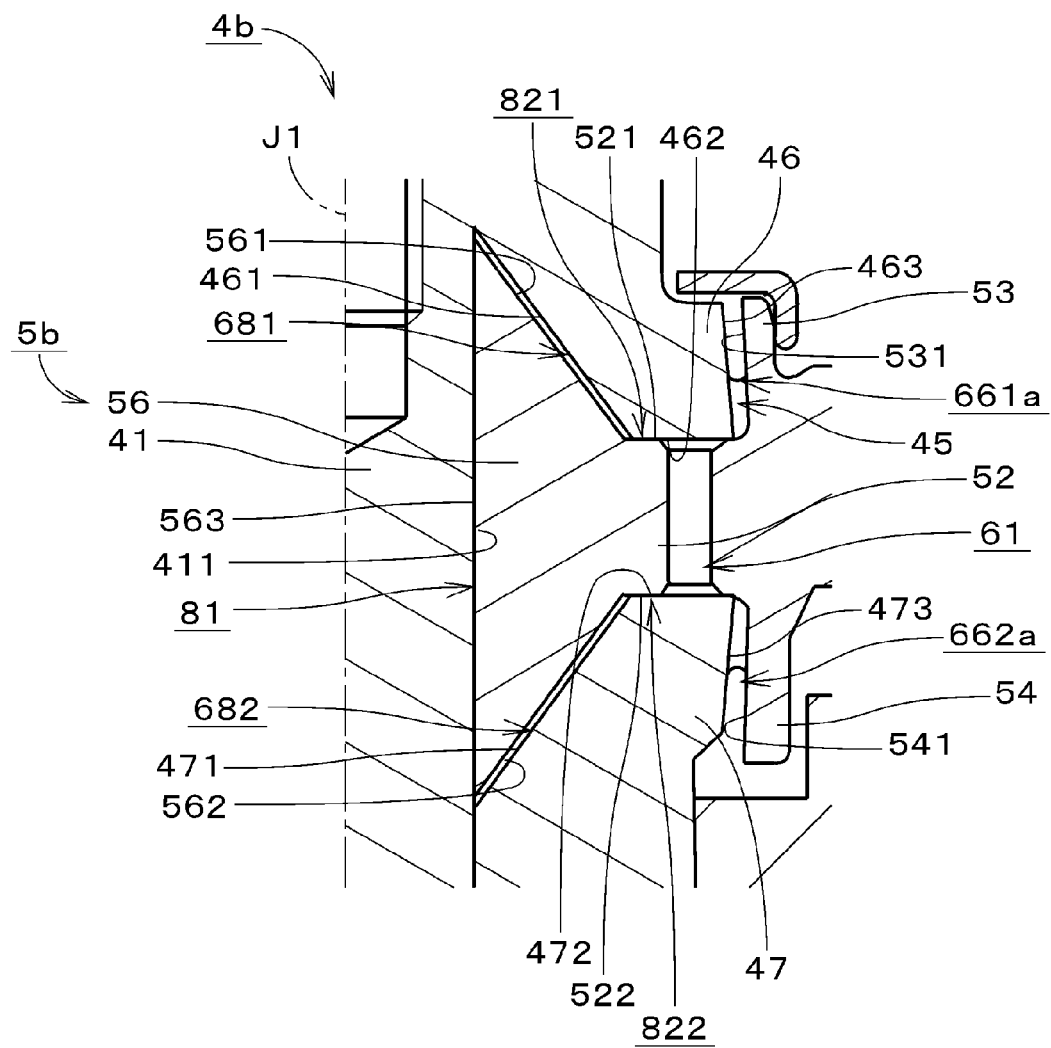
FIG. 13 is a cross-sectional view of a bearing mechanism in a motor according to a comparative example of the present invention.

FIG. 13 is a diagram illustrating a bearing mechanism 4b in a motor according to a comparative example of the present invention. The bearing mechanism 4b includes an upper thrust portion 46, a lower thrust portion 47, and a sleeve portion 5b, which are different in shape from the upper thrust portion 42, the lower thrust portion 43, and the sleeve portion 5 illustrated in FIG. 3, respectively. An inner circumferential surface 461 of the upper thrust portion 46 is arranged to be angled in a radially outward direction with decreasing height. An inner circumferential surface 471 of an upper portion of the lower thrust portion 47 is arranged to be angled in the radially outward direction with increasing height.

The sleeve portion 5b includes a barrel portion 56 and the flange portion 52. An upper portion of an outer circumferential surface of the barrel portion 56 includes an inclined surface 561 that is angled in the radially outward direction with decreasing height. Hereinafter, the inclined surface 561 will be referred to as an "upper inclined surface 561". In addition, a lower portion of the outer circumferential surface of the barrel portion 56 includes an inclined surface 562 that is angled in the radially outward direction with increasing height. Hereinafter, the inclined surface 562 will be referred to as a "lower inclined surface 562". The flange portion 52 is arranged to extend radially outward from a substantially middle of the barrel portion 56. The bearing mechanism 4b is otherwise substantially similar in structure to the bearing mechanism 4 illustrated in FIG. 3.

In the bearing mechanism 4b, a gap 681 is defined between the inner circumferential surface 461 of the upper thrust portion 46 and the upper inclined surface 561 of the barrel portion 56. The gap 681 is arranged to be angled in the radially outward direction with decreasing height. Hereinafter, the gap 681 will be referred to as an "upper inclined gap 681". A gap 682 is defined between the inner circumferential surface 471 of the lower thrust portion 47 and the lower inclined surface 562. The gap 682 is arranged to be angled in the radially outward direction with increasing height. Hereinafter, the gap 682 will be referred to as a "lower inclined gap 682".

The radial dynamic pressure bearing 81 is defined between the outer circumferential surface 411 of the shaft portion 41 and an inner circumferential surface 563 of the barrel portion 56. The upper thrust dynamic pressure bearing portion 821 is defined between the upper surface 521 of the flange portion 52 and a lower surface 462 of the upper thrust portion 46. Moreover, the lower thrust dynamic pressure bearing portion 822 is defined between the lower surface 522 of the flange portion 52 and an upper surface 472 of the lower thrust portion 47. In the bearing mechanism 4b, an upper portion of the radial dynamic pressure bearing 81 and the upper thrust dynamic pressure bearing portion 821 are arranged in communication with each other through the upper inclined gap 681. The lower portion of the radial dynamic pressure bearing 81 and the lower thrust dynamic pressure bearing portion 822 are arranged in communication with each other through the lower inclined gap 682.

The upper seal portion 661a is defined between an outer circumferential surface 463 of the upper thrust portion 46 and the inner circumferential surface 531 of the upper hub tubular portion 53. The lower seal portion 662a is defined between an outer circumferential surface 473 of the upper portion of the lower thrust portion 47 and the inner circumferential surface 541 of the lower hub tubular portion 54. The upper seal portion 661a and the lower seal portion 662a are arranged in communication with each other through the communicating hole 61. The axial distance between the surface of the lubricating oil 45 in the upper seal portion 661a and the surface of the lubricating oil 45 in the lower seal portion 662a is longer than the length of the communicating hole 61 and shorter than the length of the radial dynamic pressure bearing 81.

Also in the motor of the comparative example, a reduction in the difference in pressure between the upper seal portion 661a and the lower seal portion 662a, and easy prevention of a leakage of the lubricating oil 45, are achieved because the upper seal portion 661a and the lower seal portion 662a are arranged to be close to each other and the communicating hole 61 is arranged to have a short length.

Figure 14:
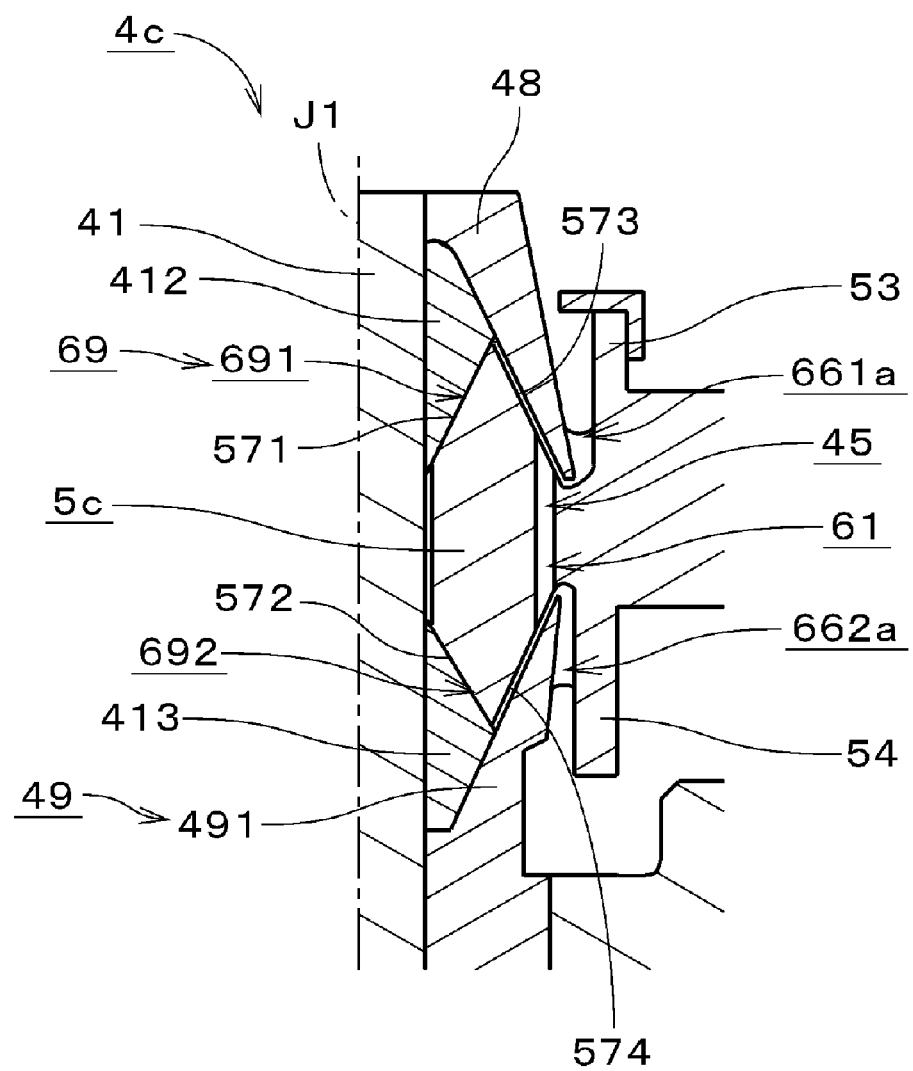
FIG. 14 is a cross-sectional view of a bearing mechanism in a motor according to a comparative example of the present invention.

FIG. 14 is a diagram illustrating a bearing mechanism 4c in a motor according to a comparative example of the present invention. The bearing mechanism 4c includes the shaft portion 41, an upper thrust portion 48, a lower thrust portion 49, and a sleeve portion 5c. The sleeve portion 5c defines a portion of the rotating portion 3, while the portions other than the sleeve portion 5c define portions of the stationary portion 2. The shaft portion 41 includes an upper annular portion 412 defined in the upper portion thereof, and a lower annular portion 413 defined in the lower portion of thereof. Each of the upper annular portion 412 and lower annular portion 413 is arranged to gradually decrease in diameter from an axial center thereof with both increasing height and decreasing height, respectively.

The upper thrust portion 48 is arranged to be angled in the radially outward direction with decreasing height. An upper portion 491 of the lower thrust portion 49 is arranged to be angled in the radially outward direction with increasing height. An upper portion 571 of an inner circumferential surface of the sleeve portion 5c is arranged to be angled in the radially outward direction with increasing height. A lower portion 572 of the inner circumferential surface of the sleeve portion 5c is arranged to be angled in the radially outward direction with decreasing height. Hereinafter, the upper portion 571 and the lower portion 572 of the inner circumferential surface of the sleeve portion 5c will be referred to as an "inner circumferential surface upper portion 571" and an "inner circumferential surface lower portion 572", respectively.

An upper portion 573 of an outer circumferential surface of the sleeve portion 5c is arranged to be angled in the radially outward direction with decreasing height. A lower portion 574 of the outer circumferential surface of the sleeve portion 5c is arranged to be angled in the radially outward direction with increasing height. Hereinafter, the upper portion 573 and the lower portion 574 of the outer circumferential surface of the sleeve portion 5c will be referred to as an "outer circumferential surface upper portion 573" and an "outer circumferential surface lower portion 574", respectively. The sleeve portion 5c includes the communicating hole 61 defined therein. The communicating hole 61 is arranged to extend substantially in parallel with the central axis J1 to make the outer circumferential surface upper portion 573 and the outer circumferential surface lower portion 574 in communication with each other.

An upper dynamic pressure gap 691 is defined between a lower portion of an outer circumferential surface of the upper annular portion 412 and the inner circumferential surface upper portion 571 of the sleeve portion 5c. A dynamic pressure groove array is arranged in the upper dynamic pressure gap 691. The upper dynamic pressure gap 691 is arranged to be angled in the radially outward direction with increasing height. A lower dynamic pressure gap 692 is defined between an upper portion of an outer circumferential surface of the lower annular portion 413 and the inner circumferential surface lower portion 572 of the sleeve portion 5c. A dynamic pressure groove array is arranged in the lower dynamic pressure gap 692. The lower dynamic pressure gap 692 is arranged to be angled in the radially outward direction with decreasing height. The upper and lower dynamic pressure gaps 691 and 692 are arranged to together define a dynamic pressure bearing 69 to support the sleeve portion 5c in both the radial and thrust directions with respect to the shaft portion 41.

The upper dynamic pressure gap 691 is arranged in communication with an upper portion of the communicating hole 61 through a gap defined between the outer circumferential surface upper portion 573 and an inner circumferential surface of the upper thrust portion 48. The lower dynamic pressure gap 692 is arranged in communication with a lower portion of the communicating hole 61 through a gap defined between the outer circumferential surface lower portion 574 and an inner circumferential surface of the lower thrust portion 49.

The upper hub tubular portion 53 and the lower hub tubular portion 54, which are arranged to project upward and downward, respectively, are arranged radially outward of the sleeve portion 5c. The upper seal portion 661a is defined between the upper thrust portion 48 and the upper hub tubular portion 53. The upper seal portion 661a is arranged radially outward of the upper dynamic pressure gap 691. The lower seal portion 662a is defined between the upper portion 491 of the lower thrust portion 49 and the lower hub tubular portion 54. The lower seal portion 662a is arranged radially outward of the lower dynamic pressure gap 692.

In the bearing mechanism 4c, the upper seal portion 661a is arranged in the vicinity of a lower end of the upper thrust portion 48, while the lower seal portion 662a is arranged in the vicinity of an upper end of the upper portion 491 of the lower thrust portion 49. In addition, the communicating hole 61 is arranged in the vicinity of the lower end of the upper thrust portion 48 and an upper end of the lower thrust portion 49. Accordingly, the axial distance between the surface of the lubricating oil 45 in the upper seal portion 661a and the surface of the lubricating oil 45 in the lower seal portion 662a is longer than the length of the communicating hole 61 and shorter than the axial length of the dynamic pressure bearing 69, i.e., the axial distance between an upper end of the upper dynamic pressure gap 691 and a lower end of the lower dynamic pressure gap 692.

Also in the motor of the comparative example, a reduction in the difference in the pressure on the lubricating oil 45 between the upper seal portion 661a and the lower seal portion 662a, and easy prevention of a leakage of the lubricating oil 45, are achieved because the upper seal portion 661a and the lower seal portion 662a are arranged to be close to each other and the communicating hole 61 is arranged to have a short length.

Figure 15:
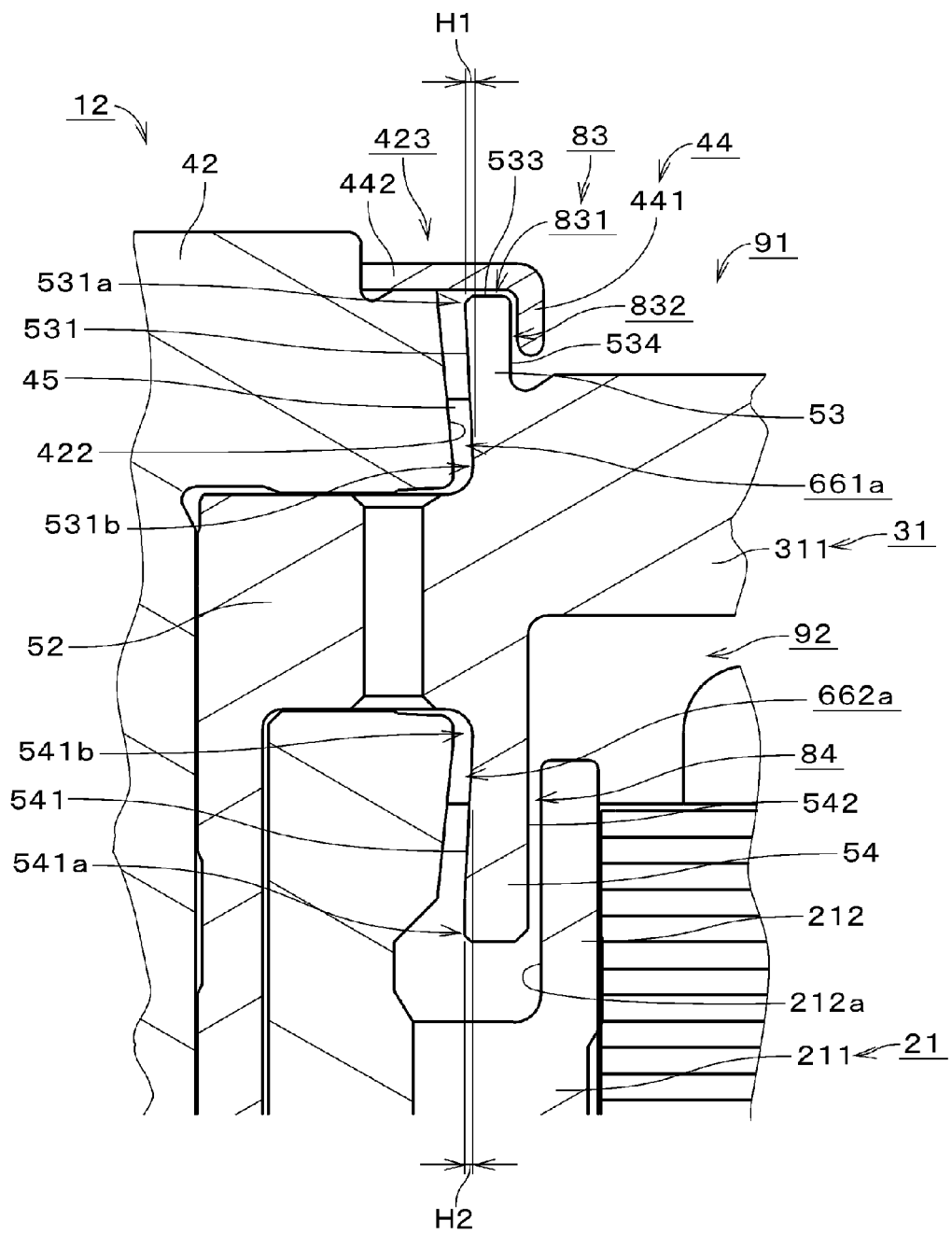
FIG. 15 is a cross-sectional view of a bearing mechanism in a motor according to a third preferred embodiment of the present invention.

FIG. 15 is an enlarged view of a portion of a motor 12 according to a third preferred embodiment of the present invention. The motor 12 includes a seal cap 44 which has substantially the same shape as that of the seal cap 44 illustrated in FIG. 3. An end portion of the cap cover portion 442 of the seal cap 44 is fixed to the shoulder portion 423 of the upper thrust portion 42 preferably through, for example, an adhesive. A radially extending gap 831 is defined between a lower surface of the cap cover portion 442 and an upper surface 533 of the upper hub tubular portion 53. The axial width of the radially extending gap 831 is smaller than the maximum radial width of the upper seal gap, i.e., the radial width of an upper end opening of the upper seal gap. Specifically, the axial width of the radially extending gap 831 is preferably in the range of about 0.05 mm to about 0.2 mm. An axially extending gap 832 is defined between an inner circumferential surface of the cap cylindrical portion 441 and an outer circumferential surface 534 of the upper hub tubular portion 53. The radial width of the axially extending gap 832 is also smaller than the maximum radial width of the upper seal gap. Specifically, the radial width of the axially extending gap 832 is preferably in the range of about 0.05 mm to about 0.2 mm.

Hereinafter, the radially extending gap 831 and the axially extending gap 832 will be referred to collectively as an "upper communicating gap 83". The upper seal portion 661a is arranged in communication with a space 91 above the cover portion 311 of the rotor hub 31 through the upper communicating gap 83. In the motor 12, the upper communicating gap 83, which has a small width and a great channel length, is defined by arranging the seal cap 44 and the upper hub tubular portion 53 to be close to but spaced from each other.

The base plate 21 includes a cylindrical portion 212 arranged to extend upward from the holder 211. The lower hub tubular portion 54 is arranged radially inward of the cylindrical portion 212. An axially extending gap 84 is defined between an inner circumferential surface 212a of the cylindrical portion 212 and an outer circumferential surface 542 of the lower hub tubular portion 54. Hereinafter, the gap 84 will be referred to as a "lower communicating gap 84". The radial width of the lower communicating gap 84 is smaller than the maximum radial width of the lower seal gap, i.e., the radial width of a lower end opening of the lower seal gap. Specifically, the radial width of the lower communicating gap 84 is preferably in the range of about 0.05 mm to about 0.2 mm. The lower seal portion 662a is arranged in communication with a space 92 below the cover portion 311 of the rotor hub 31 through a space between the lower hub tubular portion 54 and the holder 211 and the lower communicating gap 84. In the motor 12, the lower communicating gap 84, which has a small width and a great channel length, is defined by arranging the cylindrical portion 212 and the lower hub tubular portion 54 to be close to but spaced from each other. The motor 12 according to the present preferred embodiment is otherwise substantially similar in structure to the motor 12 according to the first preferred embodiment.

In the bearing mechanism 4, the upper communicating gap 83 having a small width and a large channel length contributes towards preventing an air containing an evaporated lubricating oil in the upper seal portion 661a from traveling to the space 91 above the rotor hub 31. Similarly, the lower communicating gap 84 having a small width and a great channel length contributes towards preventing an air containing an evaporated lubricating oil in the lower seal portion 662a from traveling to the space 92 below the rotor hub 31. This contributes to reducing evaporation of the lubricating oil 45 inside the bearing mechanism 4 to the outside of the motor 12.

In the bearing mechanism 4, the diameter of an upper end 531a of the inner circumferential surface 531 of the upper hub tubular portion 53 is preferably substantially equal to the diameter of a lower end 541a of the inner circumferential surface 541 of the lower hub tubular portion 54. In addition, the diameter of a lower end 531b of the inner circumferential surface 531 of the upper hub tubular portion 53 is preferably substantially equal to the diameter of an upper end 541b of the inner circumferential surface 541 of the lower hub tubular portion 54. That is, a radial range H1 of the inner circumferential surface 531 of the upper hub tubular portion 53 and a radial range H2 of the inner circumferential surface 541 of the lower hub tubular portion 54 substantially coincide with each other when viewed in the axial direction. Therefore, during rotation of the motor 12, centrifugal forces of substantially the same magnitude act on the lubricating oil 45 in the upper seal portion and the lower seal portion 661a and 662a. Moreover, air currents that are generated in the upper seal portion 661a and the lower seal portion 662a, respectively, due to the rotation of the rotor hub 31 are prevented from significantly differing from each other. This contributes to stabilizing a balance between the surfaces of the lubricating oil 45 in the upper seal portion 661a and the lower seal portion 662a.

Note that, in the motor 12, the upper end 531a of the inner circumferential surface 531 of the upper hub tubular portion 53 may be displaced in the radial direction from the lower end 541a of the inner circumferential surface 541 of the lower hub tubular portion 54. Preferably, a difference between the diameter of the upper end 531a of the inner circumferential surface 531 of the upper hub tubular portion 53 and the diameter of the lower end 541a of the inner circumferential surface 541 of the lower hub tubular portion 54 is smaller than the maximum radial width of the upper seal portion 661a, i.e., the radial width of the upper end opening of the upper seal gap. In the present preferred embodiment, the maximum radial width of the upper seal portion 661a corresponds to the radial distance between an upper end edge of a chamfer of the upper hub tubular portion 53 and an upper end edge of the outer circumferential surface 422 of the upper thrust portion 42. The chamfer is defined between the upper surface 533 and the inner circumferential surface 531 of the upper hub tubular portion 53. Note that, in the case where the chamfer is not defined in the upper hub tubular portion 53, the maximum radial width of the upper seal portion 661a corresponds to the radial distance between an upper end edge of the inner circumferential surface 531 of the upper hub tubular portion 53 and the upper end edge of the outer circumferential surface 422 of the upper thrust portion 42.

Also in the third preferred embodiment, as well as in the first preferred embodiment, a reduction in the difference in the pressure on the lubricating oil 45 between the upper seal portion 661a and the lower seal portion 662a is achieved because the upper seal portion 661a and the lower seal portion 662a are arranged to be relatively closer to each other. The same holds true for preferred embodiments of the present invention described below. In the motor 12, a reduction in the axial thickness of the flange portion 52 makes it easier to define the lower seal portion 662a and the lower communicating gap 84 around the lower hub tubular portion 54. This contributes to simplification of the structure of the motor 12. The same holds true for the preferred embodiments of the present invention described below.

Figure 16:
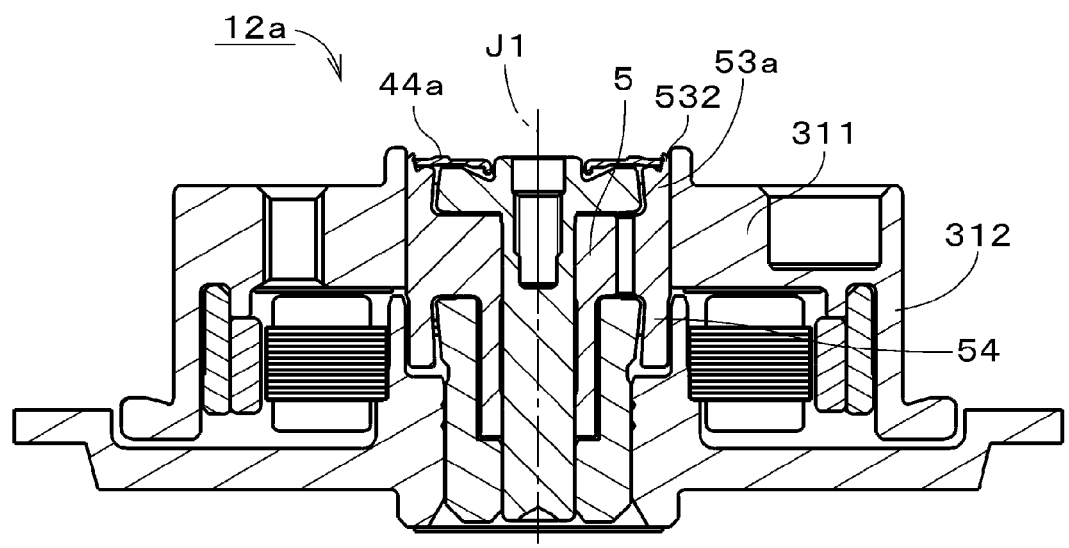
FIG. 16 is a cross-sectional view of a motor according to a fourth preferred embodiment of the present invention.

FIG. 16 is a diagram illustrating a motor 12a according to a fourth preferred embodiment of the present invention. In the motor 12a, the sleeve portion 5, an upper hub tubular portion 53a, and the lower hub tubular portion 54 are preferably defined by a single continuous monolithic member. In addition, the cover portion 311 and the cylindrical portion 312 are preferably defined by a single continuous member. The upper hub tubular portion 53a includes an annular projecting portion 532 arranged to project upward. A seal cap 44a is preferably arranged to be annular and centered on the central axis J1.

Figure 17:
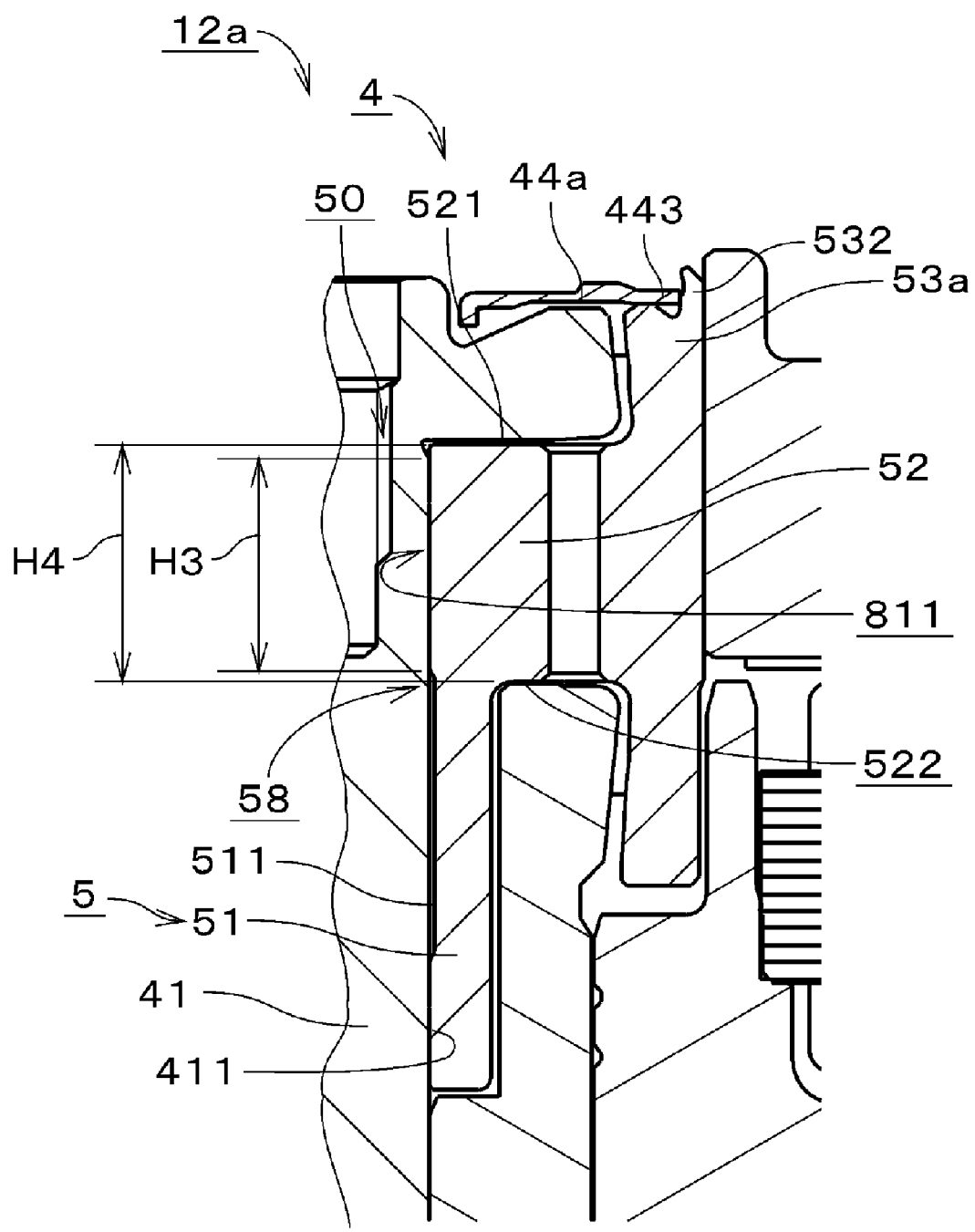
FIG. 17 is a cross-sectional view of a bearing mechanism according to the fourth preferred embodiment.

Referring to FIG. 17, in the motor 12a, a radially outer end portion 443 of the seal cap 44a is tight fitted to an inner circumferential surface of the projecting portion 532. Note that the radially outer end portion 443 of the seal cap 44a may be fixed to the upper hub tubular portion 53a preferably through, for example, an adhesive. Also note that the radially outer end portion 443 of the seal cap 44a may be fixed to the upper hub tubular portion 53a through a combination of the tight fit and use of the adhesive. A lower end of the upper radial dynamic pressure bearing portion 811, that is, a lower end 713 of the upper radial dynamic pressure groove array

711 illustrated in FIG. 5, is arranged at a level axially higher than that of the lower surface 522 of the flange portion 52. An upper end of the upper radial dynamic pressure bearing portion 811, that is, an upper end 714 of the upper radial dynamic pressure groove array 711 illustrated in FIG. 5, is arranged at a level axially lower than that of the upper surface 521 of the flange portion 52. An axial range H3 of the upper radial dynamic pressure bearing portion 811 is thereby included in an axial range H4 of the flange portion 52. The motor 12a is otherwise substantially similar in structure to the motor 12 according to the first preferred embodiment.

At the time of shaping the sleeve portion 5, at first, an initial material is subjected to a cutting process to define an external shape of the sleeve portion 5. Thereafter, a central through hole 50 is defined by cutting a central portion of the initial material in a downward direction from above with a cutting tool. Note that the central through hole 50 may instead be defined by cutting the central portion of the initial material in an upward direction from below. During the process of defining the central through hole 50, a portion of the initial material which corresponds to the inner tubular portion 51 is slightly displaced radially outward due to a pressure from the cutting tool. This portion returns radially inward once the cutting tool is pulled out of the sleeve portion 5.

Notice here that the thickness of the sleeve portion 5 undergoes a significant change in the vicinity of an axial position 58 corresponding to the lower surface 522 of the flange portion 52. This change in thickness may make it difficult to properly control the extent of cutting taking account of the amount of displacement of a portion of the inner tubular portion which is in the vicinity of the position 58 during the cutting process. This may lead to a radially inward displacement of the portion of the inner tubular portion 51 which is in the vicinity of the position 58 relative to the remaining portion of the inner tubular portion 51. Therefore, if the upper radial dynamic pressure bearing portion were arranged to extend axially beyond the lower surface of the flange portion, it might be difficult to precisely define the upper radial dynamic pressure bearing portion. A contact of the upper radial dynamic pressure groove array 711 illustrated in FIG. 5 with the outer circumferential surface 411 of the shaft portion 41 leads to NRRO (Non Repeatable Run Out).

In contrast, in the case of the bearing mechanism 4, because the axial range H3 of the upper radial dynamic pressure bearing portion 811 is included in the axial range H4 of the flange portion 52, the portion of the inner tubular portion 51 which is in the vicinity of the position 58 does not overlap with the upper radial dynamic pressure bearing portion 811. This makes it possible to precisely process the inner circumferential surface 511 of the sleeve portion 5, thereby preventing a reduction in the bearing performance of the bearing mechanism 4. It also makes it easier to design a lower portion of the inner tubular portion 51 to have a reduced thickness.

In the bearing mechanism 4, the lower end of the upper radial dynamic pressure bearing portion 811 may be arranged at substantially the same level as that of the position 58, i.e., the level of the lower surface 522 of the flange portion 52. Furthermore, a portion of the upper radial dynamic pressure bearing portion 811 may be arranged at a level slightly lower than that of the lower surface 522 of the flange portion 52 in so far as the bearing performance of the upper radial dynamic pressure bearing portion 811 is not affected. As described above, the lower end of the upper radial dynamic pressure bearing portion 811 is arranged at substantially the same level as that of the position 58, i.e., the level of the lower surface 522 of the flange portion 52. Similarly, the upper end of the upper radial dynamic pressure bearing portion 811 is arranged at substantially the same level as that of the upper surface 521 of the flange portion 52.

Figure 18:
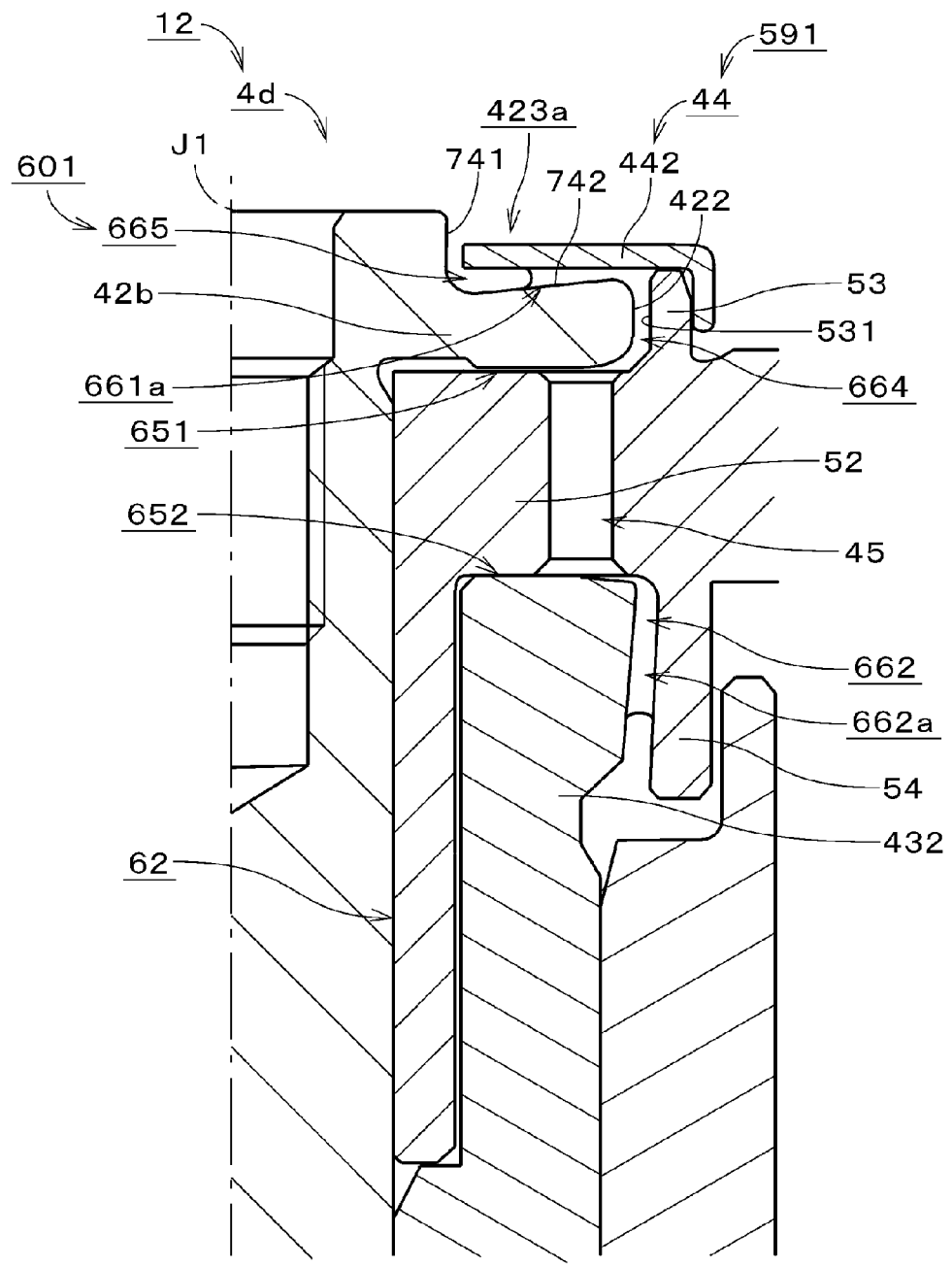
FIG. 18 is a cross-sectional view of a bearing mechanism in a motor according to a fifth preferred embodiment of the present invention.

FIG. 18 is a diagram illustrating a bearing mechanism 4d in a motor 12 according to a fifth preferred embodiment of the present invention. The bearing mechanism 4d includes an upper thrust portion 42b having a reduced axial thickness. An upper portion of the upper thrust portion 42b includes a shoulder portion 423a. The shoulder portion 423a has a greater radial width than that of the shoulder portion 423 of the upper thrust portion 42 illustrated in FIG. 3. The shoulder portion 423a includes an inner cylindrical surface 741, which is a side surface thereof, and an outer annular surface 742, which is a bottom surface thereof. The inner cylindrical surface 741 is preferably arranged to extend in the vertical direction to substantially assume the shape of a cylinder. The outer annular surface 742 is arranged radially inward of the outer circumferential surface 422, and is slightly angled in a downward direction with decreasing distance from the central axis J1.

The upper hub annular portion 591 is arranged above the outer edge portion of the flange portion 52, and includes the seal cap 44 and the upper hub tubular portion 53. The radial width of the cap cover portion 442 of the seal cap 44 according to the present preferred embodiment is arranged to be greater than that of the cap cover portion 442 of the seal cap 44 illustrated in FIG. 3. The fifth gap 601, which is defined between the upper thrust portion 42b and a combination of the seal cap 44 and the upper hub tubular portion 53, includes an upper vertical gap 664 and an upper horizontal gap 665. The upper vertical gap 664 is defined between the outer circumferential surface 422 of the upper thrust portion 42b and the inner circumferential surface 531 of the upper hub tubular portion 53, and is arranged to extend upward from an outer edge portion of the upper thrust gap 651. The upper horizontal gap 665 is defined between the lower surface of the cap cover portion 442 and the outer annular surface 742, and is arranged to extend radially inward from an upper end of the upper vertical gap 664. The upper horizontal gap 665 is arranged to be perpendicular or substantially perpendicular to the central axis J1. The axial width of the upper horizontal gap 665 is arranged to gradually increase with decreasing distance from the central axis J1.

The upper surface of the lubricating oil 45 is located in the upper horizontal gap 665. Hereinafter, the upper horizontal gap 665 will be referred to as an "upper seal gap 665". The upper seal portion 661a arranged to retain the lubricating oil 45 through capillary action is defined in the upper seal gap 665. A portion of the lubricating oil 45 which is located in the upper vertical gap 664 is continuous with the upper surface of the lubricating oil 45 in the upper seal gap 665. As in the case of FIG. 3, the lower seal gap 662, which is arranged to extend downward from an outer edge portion of the lower thrust gap 652, is defined between the lower hub tubular portion 54 and the outer tubular portion 432. The lower seal portion 662a is defined in the lower seal gap 662. The bearing mechanism 4d is otherwise substantially similar in structure to the bearing mechanism 4 illustrated in FIG. 3.

Figure 19:
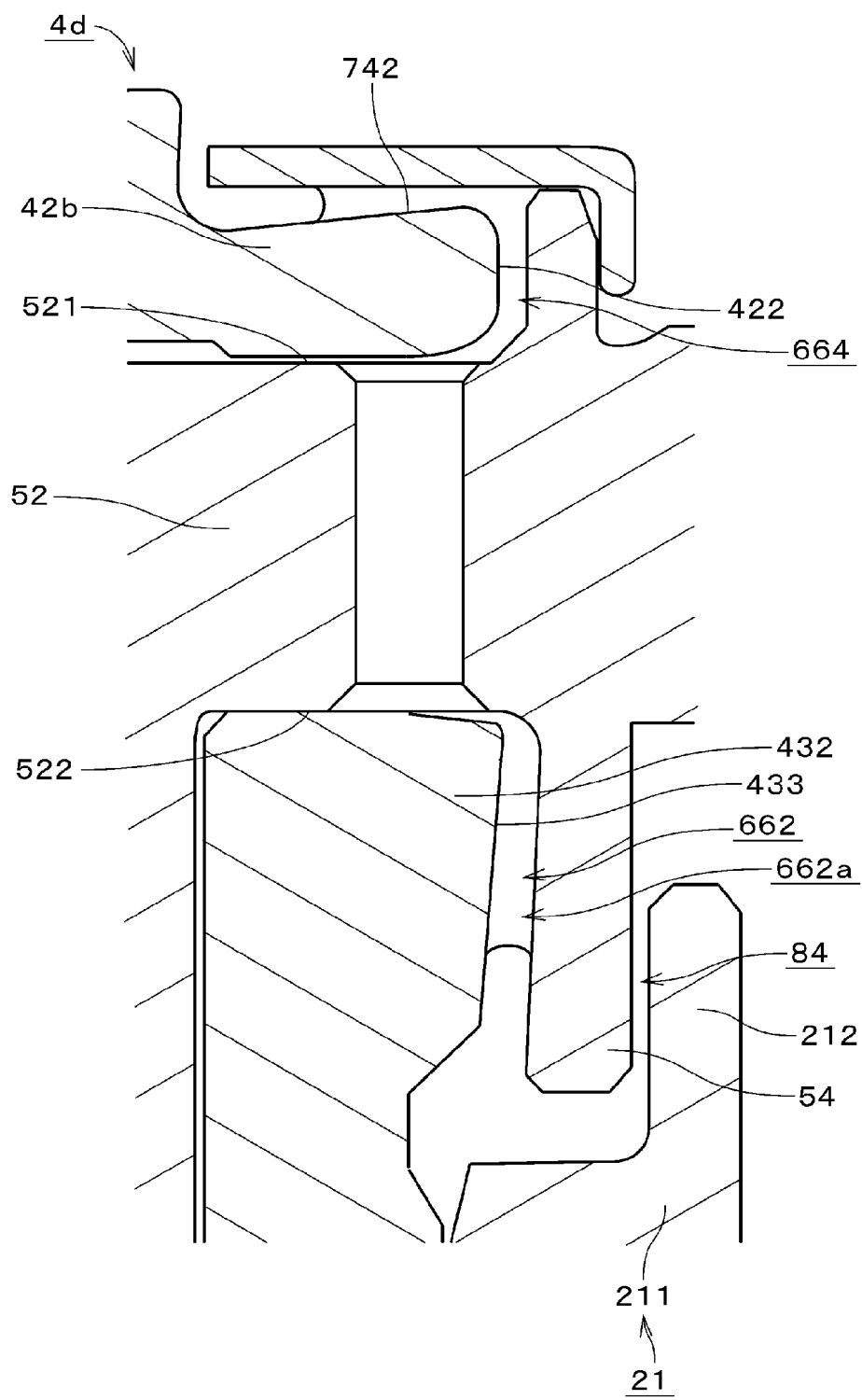
FIG. 19 is a cross-sectional view of the bearing mechanism.

Referring to FIG. 19, the axial length of the lower seal gap 662 is preferably arranged to be greater than that of the upper vertical gap 664. Here, the axial length of the lower seal gap 662 refers to the axial distance between a lower end edge of the inclined surface 433 of the outer tubular portion 432 and the lower surface 522 of the flange portion 52. The axial length of the upper vertical gap 664 refers to the axial distance between the upper surface 521 of the flange portion 52 and the highest point of a portion of the upper thrust portion 42b at which the outer annular surface 742 and the outer circumferential surface 422 meet. Note that, in the case where there is a clear boundary between the outer annular surface 742 and the outer circumferential surface 422, the axial length of the upper vertical gap 664 refers to the axial distance between the boundary and the upper surface 521 of the flange portion 52.

As in the case of the motor 12 illustrated in FIG. 15, the lower communicating gap 84, which is arranged to extend in the axial direction, is defined between the lower hub tubular portion 54 and the cylindrical portion 212, which is arranged to extend upward from the holder 211 of the base plate 21. Providing the lower communicating gap 84 contributes towards preventing an air containing an evaporated lubricating oil in the lower seal portion 662a from traveling to the outside of the bearing mechanism 4d.

While the motor 12 illustrated in FIG. 18 is driven, a centrifugal force is generated to press a portion of the lubricating oil 45 in the upper seal gap 665 in the direction of the upper vertical gap 664. This contributes to more securely preventing leakage of the lubricating oil 45 through the upper seal portion 661a. The generation of the centrifugal force also contributes to distributing the lubricating oil 45 more toward the lower seal portion 662a than toward the upper seal portion 661a. In the bearing mechanism 4d, the lower seal gap 662 is arranged to have a sufficient axial length to prevent leakage of the lubricating oil 45 through the lower seal gap 662.

In the motor 12 according to the fifth preferred embodiment, the upper seal portion 661a is oriented radially inward to make it possible to achieve a reduced thickness of the upper thrust portion 42b. The reduced thickness of the upper thrust portion 42b makes it possible to secure a sufficient axial length of the radial gap 62 while achieving a reduced axial thickness of the motor 12.

Note that, in the motor 12, both of the lower surface of the cap cover portion 442 and the outer annular surface 742 may be arranged to be significantly angled in the downward direction with decreasing distance from the central axis J1 so that the upper seal portion 661a is arranged to be significantly angled in the downward direction with decreasing distance from the central axis J1. Also note that both of the lower surface of the cap cover portion 442 and the outer annular surface 742 may be arranged to be angled in the upward direction with decreasing distance from the central axis J1 so that the upper seal portion 661a is arranged to be angled in the upward direction with decreasing distance from the central axis J1.

While preferred embodiments of the present invention have been described above, the present invention is not limited to the above-described preferred embodiments, but a variety of modifications are possible. For example, the lower thrust portion 43 and the base plate 21 may be defined by a single continuous member. In this case, a reduction in the number of components of the motor is achieved. Also, in each of the preferred embodiments described above, the shaft portion 41 and the upper thrust portion 42 may be defined by separate members. Also, the lower plate portion 431 and the outer tubular portion 432 may be defined by separate members. Also, the lower thrust portion 43 and the shaft portion 41 may be defined by a single continuous monolithic member.

In the groove upper portion of the upper radial dynamic pressure groove array 711 illustrated in FIG. 5, a plurality of oblique grooves may be arranged to extend obliquely along the grooves constituting the upper radial dynamic pressure groove array 711. Also, in the groove upper portion, each of the grooves constituting the upper radial dynamic pressure groove array 711 may be arranged to have a greater depth than in the groove lower portion. This leads to an increased downward pressure acting on the lubricating oil 45. The same holds true for the groove lower portion of the lower radial dynamic pressure groove array 712. Also, the upper portion and the lower portion of each of the grooves that define the upper radial dynamic pressure groove array 711 may be arranged to have substantially the same length. Also, the upper portion and the lower portion of each of the grooves that define the lower radial dynamic pressure groove array 712 may be arranged to have substantially the same length. A variety of modifications can be made to the length, depth, width, and so on of each of the dynamic pressure grooves without departing from the scope and spirit of the present invention.

Each of the upper and lower thrust dynamic pressure groove arrays 721 and 722 may be arranged in the herringbone pattern. In this case, a radially outer portion of each of upper thrust dynamic pressure grooves that define the upper thrust dynamic pressure groove array 721 is arranged to have a length greater than that of a radially inner portion thereof, and a radially outer portion of each of lower thrust dynamic pressure grooves that define the lower thrust dynamic pressure groove array 722 is arranged to have a length greater than that of a radially inner portion thereof, in order to generate a radially inward pressure acting on the lubricating oil 45. Note that a plurality of oblique grooves may be arranged between the radially outer portions of the thrust dynamic pressure grooves. The radially outer portion of each thrust dynamic pressure groove may be arranged to have a depth greater than that of the radially inner portion thereof. Although a direction in which the lubricating oil 45 circulates has not been specified in the description of any of the above-described preferred embodiments, the direction in which the lubricating oil 45 circulates may be determined to be either a counterclockwise direction or a clockwise direction in FIG. 4.

In FIG. 4, in the case where the lower surface 421 of the upper thrust portion 42 is arranged to have a sufficient area, the upper thrust dynamic pressure groove array 721 may be arranged in a region radially inward of and spaced far away from the communicating hole 61. Similarly, in the case where the upper surface 435 of the outer tubular portion 432 is arranged to have a sufficient area, the lower thrust dynamic pressure groove array 722 may be arranged in a region radially inward of and spaced far away from the communicating hole 61. In the upper and lower thrust gaps 651 and 652, an upper thrust dynamic pressure groove array and a lower thrust dynamic pressure groove array may be arranged in the upper surface 521 and the lower surface 522, respectively, of the flange portion 52. Also, a radial dynamic pressure groove array may be arranged in the outer circumferential surface 411 of the shaft portion 41.

In the first preferred embodiment described above, the upper seal gap 661 may be arranged to have a substantially uniform width. In that case, a dynamic pressure groove array is arranged in at least one of the outer circumferential surface 422 of the upper thrust portion 42 and the inner circumferential surface 531 of the upper hub tubular portion 53 to define a so-called pumping seal. A dynamic pressure acting on the lubricating oil 45 in the direction of an interior of the upper seal gap 661 is thereby generated to retain the lubricating oil 45. The same holds true for the lower seal gap 662. The same holds true for each of the second to fourth preferred embodiments. Also in the fifth preferred embodiment, the upper seal gap 665 may be arranged to have a substantially uniform width. In this case, a dynamic pressure groove array may be arranged in at least one of the lower surface of the cap cover portion 442 and the outer annular surface 742 to define a pumping seal in the upper seal gap 665. Also, a pumping seal may be defined in the upper vertical gap 664, which is defined between the upper thrust portion 42 and the upper hub tubular portion 53. In each of the first to fourth preferred embodiments, each of the upper seal portion and the lower seal portion 661a and 662a may not necessarily be arranged to extend in parallel or substantially in parallel with the central axis J1, but may be arranged to be angled significantly with respect to the central axis J1.

Figure 20:
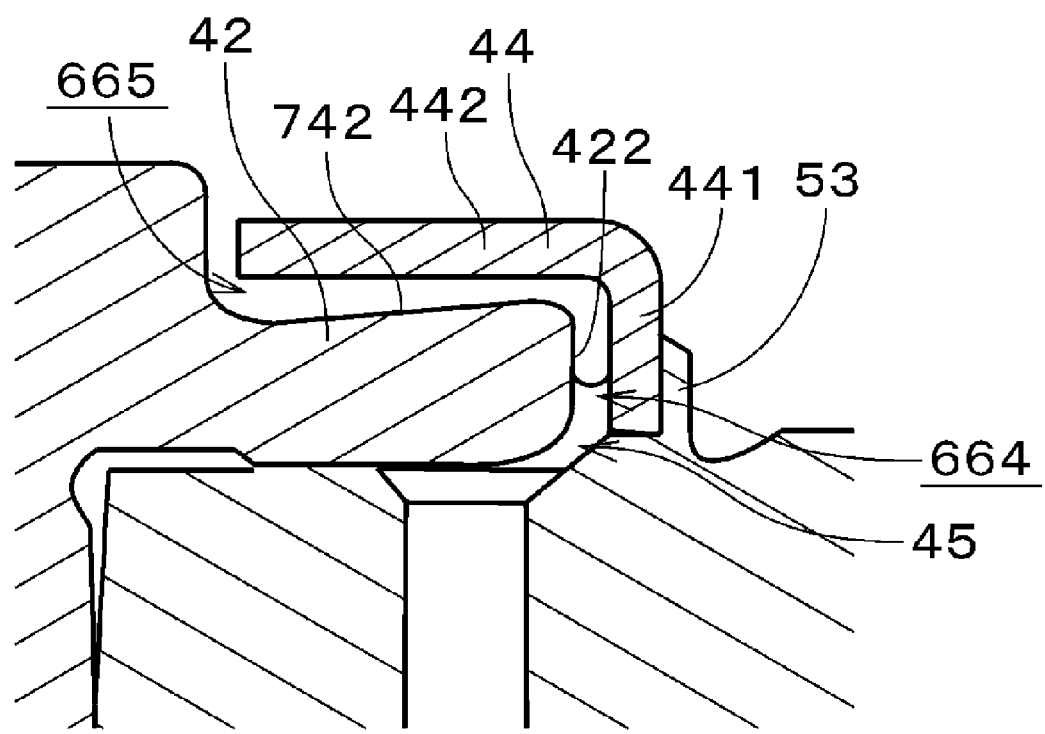
FIG. 20 is a cross-sectional view of a bearing mechanism according to another preferred embodiment of the present invention.

Referring to FIG. 20, in the first preferred embodiment of the present invention, the cap cylindrical portion 441 of the seal cap 44 may be fixed to an inside of the upper hub tubular portion 53. In this case, the upper vertical gap 664 is defined between the cap cylindrical portion 441 and the outer circumferential surface 422 of the upper thrust portion 42. The axially upper surface of the lubricating oil 45 is located in the upper vertical gap 664. Note that the upper surface of the lubricating oil 45 may be arranged in the upper horizontal gap 665, which is defined between the cap cover portion 442 and the outer annular surface 742. Also in other preferred embodiments, the cap cylindrical portion 441 may be fixed to the inside of the upper hub tubular portion 53.

In the upper hub annular portion 591, the upper hub tubular portion 53 and the seal cap 44 may be defined by a single continuous member. Also, in the first preferred embodiment, in the case where the likelihood of a leakage of the lubricating oil 45 is low, the seal cap 44 may be eliminated with the upper hub annular portion being defined by only the upper hub tubular portion 53. In this case, the fifth gap is defined by only the upper vertical gap 661, which is defined between the upper hub tubular portion 53 and the upper thrust portion 42. The same holds true for other preferred embodiments.

In the rotating portion 3 of the motor 12 according to the first preferred embodiment, only the lower hub tubular portion 54 is arranged as a member (hereinafter referred to as a "lower hub annular portion") that is arranged below the outer edge portion of the flange portion 52. Note, however, that the lower hub annular portion may be defined by a plurality of members. For example, the lower hub annular portion may be defined by the lower hub tubular portion 54 and a cap member attached to a top of the lower hub tubular portion 54. In this case, the sixth gap between the lower hub annular portion and the outer tubular portion 432 is defined between the outer tubular portion 432 and a combination of the lower hub tubular portion 54 and the cap member. The lower vertical gap is defined between the outer tubular portion 432 and the lower hub tubular portion 54 or the cap member, and the lower seal gap is defined by either the lower vertical gap or a gap continuous therewith. In the case where the lower seal gap is defined by the gap continuous with the lower vertical gap, a portion of the lubricating oil 45 which is located in the lower vertical gap is continuous with the lower surface of the lubricating oil 45 in the lower seal gap. The same holds true for other preferred embodiments.

Features of the above-described preferred embodiments and modifications thereof may be combined as appropriate as long as no conflict arises.

The present invention is applicable to motors for use in storage disk drives, and also to motors used for other purposes.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A spindle motor comprising:
a stationary portion including a stator; and
a rotating portion including a rotor magnet and rotatably supported by the stationary portion; wherein
the stationary portion includes:
   a shaft portion centered on a central axis and extending in a vertical direction;
   an upper thrust portion extending radially outward from an upper portion of the shaft portion;
   a lower plate portion extending radially outward from a lower portion of the shaft portion; and
   an outer tubular portion extending upward from an outer edge portion of the lower plate portion;
the rotating portion includes:
   an inner tubular portion including an inner circumferential surface arranged to define a first gap together with an outer circumferential surface of the shaft portion, and an outer circumferential surface arranged to define a second gap together with an inner circumferential surface of the outer tubular portion;
   a flange portion projecting radially outward from the inner tubular portion, and including a lower surface arranged to define a third gap together with an upper surface of the outer tubular portion, an upper surface arranged to define a fourth gap together with a lower surface of the upper thrust portion, and a communicating hole arranged to extend through the flange portion from the upper surface to the lower surface thereof;
   an upper hub annular portion arranged above an outer edge portion of the flange portion; and
   a lower hub annular portion arranged below the outer edge portion of the flange portion;
the upper thrust portion and the upper hub annular portion are arranged to together define a fifth gap that is continuous with the fourth gap therebetween;
the outer tubular portion and the lower hub annular portion are arranged to together define a sixth gap that is continuous with the third gap therebetween;
the fifth gap includes an upper surface of a lubricating oil located therein, while the sixth gap includes a lower surface of the lubricating oil located therein;
the communicating hole and a space extending from the fifth gap to the sixth gap through the fourth gap, the first gap, the second gap, and the third gap are continuously filled with the lubricating oil; and
the first gap includes a dynamic pressure bearing provided therein.

2. The spindle motor according to claim 1, wherein
the upper hub annular portion includes an upper hub tubular portion extending upward from the outer edge portion of the flange portion; and
the fifth gap includes an upper vertical gap defined between an outer circumferential surface of the upper thrust portion and an inner circumferential surface of the upper hub tubular portion, and extending upward from the fourth gap.

3. The spindle motor according to claim 2, wherein the upper surface of the lubricating oil is located in the upper vertical gap.

4. The spindle motor according to claim 2, wherein a portion of the lubricating oil which is located in the upper vertical gap is continuous with the upper surface of the lubricating oil.

5. The spindle motor according to claim 2, wherein
the upper hub annular portion includes an annular cap member extending radially inward from the upper hub tubular portion; and
the fifth gap includes an upper horizontal gap defined between the cap member and an upper portion of the upper thrust portion, and extending in a radial direction.

6. The spindle motor according to claim 5, wherein the upper surface of the lubricating oil is located in the upper horizontal gap.

7. The spindle motor according to claim 6, wherein an axial width of the upper horizontal gap is arranged to gradually increase with decreasing distance from the central axis.

8. The spindle motor according to claim 1, wherein
the lower hub annular portion includes a lower hub tubular portion extending downward from the outer edge portion of the flange portion; and
the sixth gap includes a lower vertical gap defined between an outer circumferential surface of the outer tubular portion and an inner circumferential surface of the lower hub tubular portion, and extending downward from the third gap.

9. The spindle motor according to claim 8, wherein the lower surface of the lubricating oil is located in the lower vertical gap.

10. The spindle motor according to claim 8, wherein a portion of the lubricating oil which is located in the lower vertical gap is continuous with the lower surface of the lubricating oil.

11. The spindle motor according to claim 8, wherein
the upper hub annular portion includes an upper hub tubular portion extending upward from the outer edge portion of the flange portion;
the fifth gap includes an upper vertical gap defined between an outer circumferential surface of the upper thrust portion and an inner circumferential surface of the upper hub tubular portion, and extending upward from the fourth gap;
a radial width of the lower vertical gap is arranged to gradually increase with decreasing height, and the lower surface of the lubricating oil is located in the lower vertical gap; and
an axial length of the lower vertical gap is greater than an axial length of the upper vertical gap.

12. The spindle motor according to claim 8, wherein
the stationary portion includes a cylindrical portion arranged radially outward of the lower hub tubular portion, and extending upward; and
an outer circumferential surface of the lower hub tubular portion and an inner circumferential surface of the cylindrical portion are arranged to together define a lower communicating gap therebetween, the lower communicating gap having a total radial width smaller than a maximum radial width of the lower vertical gap.

13. The spindle motor according to claim 1, wherein
the third gap includes a dynamic pressure generation portion arranged to produce a radially inward pressure acting on the lubricating oil; and
the dynamic pressure generation portion is arranged radially inward of a circle which is centered on the central axis and which touches a lower end opening of the communicating hole at a radially outer point.

14. The spindle motor according to claim 13, wherein
the third gap includes an outer region radially outward of an outer circumference of the dynamic pressure generation portion, and pressure in the outer region is equal to or substantially equal to an atmospheric pressure; and
the lower end opening of the communicating hole is located in the outer region of the third gap.

15. The spindle motor according to claim 1, wherein
the fourth gap includes a dynamic pressure generation portion arranged to produce a radially inward pressure acting on the lubricating oil; and
the dynamic pressure generation portion is arranged radially inward of a circle which is centered on the central axis and which contacts an upper end opening of the communicating hole at a radially outer point.

16. The spindle motor according to claim 15, wherein
the fourth gap includes an outer region radially outward of an outer circumference of the dynamic pressure generation portion, and pressure in the outer region is equal to or substantially equal to an atmospheric pressure; and
the upper end opening of the communicating hole is located in the outer region of the fourth gap.

17. The spindle motor according to claim 1, wherein
the rotating portion includes a cover portion arranged above the stator and including a screw hole arranged to be used to fix a clamper to clamp a disk; and
an upper surface of the upper thrust portion, an upper surface of the cover portion, the upper surface of the flange portion, a lower surface of the cover portion, and the upper surface of the outer tubular portion are arranged at increasingly lower axial levels in this order.

18. The spindle motor according to claim 1, wherein
the dynamic pressure bearing includes an upper dynamic pressure bearing portion and a lower dynamic pressure bearing portion; and
a lower end of the upper dynamic pressure bearing portion is arranged at an axial level substantially identical to that of the lower surface of the flange portion or at an axial level higher than that of the lower surface of the flange portion.

19. The spindle motor according to claim 1, wherein
the dynamic pressure bearing includes an upper dynamic pressure bearing portion and a lower dynamic pressure bearing portion;
an upper end of the upper dynamic pressure bearing portion is arranged at an axial level substantially identical to that of the upper surface of the flange portion or at an axial level lower than that of the upper surface of the flange portion.

20. A storage disk drive comprising:
the spindle motor of claim 1 arranged to rotate a disk;
an access portion arranged to perform at least one of reading and writing of information from or to the disk; and
a housing arranged to contain the disk, the motor, and the access portion.

* * * * *